United States Patent
Lussier et al.

(10) Patent No.: US 10,328,982 B2
(45) Date of Patent: *Jun. 25, 2019

(54) DRIVE SPROCKET, DRIVE LUG CONFIGURATION AND TRACK DRIVE ARRANGEMENT FOR AN ENDLESS TRACK VEHICLE

(71) Applicant: Camso Inc., Magog (CA)

(72) Inventors: Alain Lussier, St-Francois-Xavier-de-Brompton (CA); Francois Leblanc, Magog (CA); Patrice Boily, St-Catherine-de-Hatley (CA)

(73) Assignee: Camso Inc., Magog (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/139,572

(22) Filed: Apr. 27, 2016

(65) Prior Publication Data

US 2016/0332682 A1 Nov. 17, 2016

Related U.S. Application Data

(63) Continuation of application No. 13/326,278, filed on Dec. 14, 2011, now Pat. No. 9,334,001.

(60) Provisional application No. 61/422,947, filed on Dec. 14, 2010, provisional application No. 61/426,979, filed on Dec. 23, 2010.

(51) Int. Cl.
| | |
|---|---|
| *B62D 55/125* | (2006.01) |
| *B62D 55/24* | (2006.01) |
| *B62D 55/12* | (2006.01) |
| *B62D 55/06* | (2006.01) |

(52) U.S. Cl.
CPC ......... *B62D 55/125* (2013.01); *B62D 55/244* (2013.01); *B62D 55/06* (2013.01); *B62D 55/12* (2013.01)

(58) Field of Classification Search
CPC .... B62D 55/12; B62D 55/125; B62D 55/244; G01M 17/007; G01M 17/013; G01M 17/03
USPC ....................................................... 701/50
See application file for complete search history.

(56) References Cited

U.S. PATENT DOCUMENTS

| | | | |
|---|---|---|---|
| 2,040,696 | A | 5/1936 | Johnston |
| 2,369,130 | A | 2/1945 | Benson |
| 2,461,150 | A | 2/1949 | Flynn et al. |
| 2,562,264 | A | 7/1951 | Ford |

(Continued)

FOREIGN PATENT DOCUMENTS

| | | |
|---|---|---|
| CA | 2606039 | 4/2009 |
| CA | 2838935 | 1/2013 |

(Continued)

OTHER PUBLICATIONS

U.S. Appl. No. 13/649,312, filed Oct. 11, 2012, Zuchoski et al.

(Continued)

*Primary Examiner* — Kip T Kotter
(74) *Attorney, Agent, or Firm* — Fish & Richardson P.C.

(57) ABSTRACT

A sprocket for a tracked vehicle. The sprocket has a plurality of sockets for engaging drive lugs on an inner surface of a track driven by the sprocket. The sprocket also including a support surface for engaging with an inner surface of the track and which is in rolling contact with the inner surface of the track.

27 Claims, 22 Drawing Sheets

(56) References Cited

U.S. PATENT DOCUMENTS

| | | | |
|---|---|---|---|
| 2,596,919 A | 5/1952 | Smith | |
| 2,845,308 A | 7/1958 | Woltemar | |
| 2,854,294 A | 9/1958 | Bannister | |
| 3,019,061 A | 1/1962 | Schomers | |
| 3,118,709 A | 1/1964 | Case | |
| 3,464,476 A | 9/1969 | Scheuba et al. | |
| 3,582,154 A | 6/1971 | Russ, Sr. | |
| 3,612,626 A | 10/1971 | Fuchs | |
| 3,747,995 A | 7/1973 | Russ, Sr. | |
| 3,747,996 A | 7/1973 | Huber | |
| 3,767,275 A | 10/1973 | Russ | |
| 3,781,067 A | 12/1973 | Dodson et al. | |
| 3,858,948 A | 1/1975 | Johnson et al. | |
| 3,887,244 A | 6/1975 | Haslett et al. | |
| 3,944,006 A | 3/1976 | Lassanske | |
| 4,059,313 A | 11/1977 | Beyers et al. | |
| RE29,718 E | 8/1978 | Reinsma et al. | |
| 4,150,858 A | 4/1979 | Fox et al. | |
| 4,218,101 A | 8/1980 | Thompson | |
| 4,279,449 A | 7/1981 | Martin et al. | |
| 4,538,860 A | 9/1985 | Edwards et al. | |
| 4,583,791 A | 4/1986 | Nagata et al. | |
| 4,586,757 A | 5/1986 | Bloechlinger | |
| 4,587,280 A | 5/1986 | Guha et al. | |
| 4,607,892 A | 8/1986 | Payne et al. | |
| 4,614,508 A * | 9/1986 | Kerivan | B41J 11/30 226/74 |
| 4,696,520 A | 9/1987 | Henke et al. | |
| 4,721,498 A | 1/1988 | Grob | |
| D298,018 S | 10/1988 | Cartwright | |
| 4,843,114 A | 6/1989 | Touchet et al. | |
| 4,844,561 A | 7/1989 | Savage et al. | |
| 4,880,283 A | 11/1989 | Savage et al. | |
| 4,953,921 A | 9/1990 | Burns | |
| 4,981,188 A | 1/1991 | Kadela | |
| 5,018,591 A | 5/1991 | Price | |
| 5,050,710 A | 9/1991 | Bargfrede | |
| 5,088,045 A | 2/1992 | Shimanaka et al. | |
| 5,145,242 A | 9/1992 | Togashi | |
| 5,190,363 A | 3/1993 | Brittain et al. | |
| 5,299,860 A | 4/1994 | Anderson | |
| 5,320,585 A | 6/1994 | Kato | |
| 5,352,029 A | 10/1994 | Nagorcka | |
| 5,362,142 A | 11/1994 | Katoh | |
| 5,368,115 A | 11/1994 | Crabb | |
| 5,368,376 A | 11/1994 | Edwards et al. | |
| 5,380,076 A | 1/1995 | Hori | |
| 5,447,365 A | 9/1995 | Muramatsu et al. | |
| 5,474,146 A | 12/1995 | Yoshioka et al. | |
| 5,482,364 A * | 1/1996 | Edwards | B62D 55/092 305/157 |
| 5,498,188 A | 3/1996 | Deahr | |
| 5,511,869 A * | 4/1996 | Edwards | B62D 55/092 305/100 |
| 5,513,683 A | 5/1996 | Causa et al. | |
| 5,540,489 A | 7/1996 | Muramatsu et al. | |
| 5,632,537 A | 5/1997 | Yoshimura et al. | |
| 5,707,123 A | 1/1998 | Grob | |
| 5,722,745 A | 3/1998 | Courtemanche et al. | |
| 5,813,733 A | 9/1998 | Hori et al. | |
| 5,866,265 A | 2/1999 | Reilly et al. | |
| 5,894,900 A | 4/1999 | Yamamoto et al. | |
| 5,904,217 A | 5/1999 | Yamamoto et al. | |
| 5,984,438 A | 11/1999 | Tsunoda et al. | |
| 5,997,109 A | 12/1999 | Kautsch | |
| 6,000,766 A * | 12/1999 | Takeuchi | B62D 55/088 305/114 |
| 6,024,183 A * | 2/2000 | Dietz | B62D 55/30 180/9.1 |
| 6,030,057 A | 2/2000 | Fikse | |
| 6,056,656 A | 5/2000 | Kitano et al. | |
| 6,065,818 A | 5/2000 | Fischer | |
| 6,068,354 A | 5/2000 | Akiyama et al. | |
| 6,074,025 A | 6/2000 | Juncker et al. | |
| 6,079,802 A | 6/2000 | Nishimura et al. | |
| 6,095,275 A | 8/2000 | Shaw | |
| 6,120,405 A | 9/2000 | Oertley et al. | |
| 6,129,426 A | 10/2000 | Tucker | |
| 6,139,121 A | 10/2000 | Muramatsu | |
| 6,153,686 A | 11/2000 | Granatowicz et al. | |
| 6,170,925 B1 | 1/2001 | Ono | |
| 6,176,557 B1 | 1/2001 | Ono | |
| 6,186,604 B1 | 2/2001 | Fikse | |
| 6,193,335 B1 | 2/2001 | Edwards | |
| 6,196,646 B1 | 3/2001 | Edwards | |
| 6,206,492 B1 | 3/2001 | Moser | |
| 6,241,327 B1 | 6/2001 | Gleasman et al. | |
| 6,229,264 B1 | 10/2001 | Kautsch et al. | |
| 6,296,329 B1 | 10/2001 | Rodgers et al. | |
| 6,299,264 B1 | 10/2001 | Kautsch et al. | |
| 6,300,396 B1 | 10/2001 | Tsunoda et al. | |
| 6,352,320 B1 | 3/2002 | Bonko et al. | |
| 6,386,652 B1 | 5/2002 | Bonko | |
| 6,386,654 B1 | 5/2002 | Singer et al. | |
| 6,401,847 B1 | 6/2002 | Lykken | |
| 6,406,106 B1 | 6/2002 | Moss | |
| 6,406,655 B1 | 6/2002 | Courtemanche | |
| 6,416,142 B1 | 7/2002 | Oertley | |
| 6,474,756 B2 | 11/2002 | Hori et al. | |
| 6,494,548 B2 | 12/2002 | Courtemanche | |
| 6,536,852 B2 | 3/2003 | Katayama et al. | |
| 6,536,853 B2 | 3/2003 | Egle et al. | |
| 6,568,769 B1 | 5/2003 | Watanabe et al. | |
| D476,599 S | 7/2003 | Whittington | |
| 6,588,862 B1 | 7/2003 | Pringiers | |
| 6,652,043 B2 | 11/2003 | Oertley | |
| 6,698,850 B2 | 3/2004 | Ueno | |
| D488,171 S | 4/2004 | Juncker et al. | |
| 6,716,012 B2 | 4/2004 | Yovichin et al. | |
| 6,733,091 B2 | 5/2004 | Deland et al. | |
| 6,769,746 B2 | 8/2004 | Rodgers et al. | |
| 6,800,236 B1 | 10/2004 | Kurata et al. | |
| 6,848,757 B2 | 2/2005 | Ueno | |
| 6,874,586 B2 | 4/2005 | Boivin et al. | |
| D505,136 S | 5/2005 | Brazier | |
| 6,913,329 B1 | 7/2005 | Rodgers et al. | |
| 6,923,515 B2 | 8/2005 | Konickson et al. | |
| 6,932,442 B2 | 8/2005 | Hori | |
| 6,935,708 B2 | 8/2005 | Courtemanche | |
| 6,962,222 B2 | 11/2005 | Kirihata | |
| 6,964,462 B2 | 11/2005 | Katoh et al. | |
| 6,974,196 B2 | 12/2005 | Gagne et al. | |
| 7,001,294 B2 | 2/2006 | Fukuda | |
| 7,032,636 B2 | 4/2006 | Salakari | |
| 7,077,216 B2 | 7/2006 | Juncker | |
| D528,133 S | 9/2006 | Brazier | |
| 7,114,788 B2 | 10/2006 | Deland et al. | |
| 7,131,508 B2 | 11/2006 | Brazier | |
| 7,137,675 B1 | 11/2006 | Simula et al. | |
| 7,222,924 B2 | 5/2007 | Christianson | |
| 7,229,141 B2 | 6/2007 | Dandurand et al. | |
| 7,252,348 B2 | 8/2007 | Gingras | |
| 7,293,844 B2 | 11/2007 | Uchiyama | |
| D556,791 S | 12/2007 | Brazier | |
| 7,325,888 B2 | 2/2008 | Fujita et al. | |
| 7,367,637 B2 | 5/2008 | Gleasman | |
| 7,407,236 B2 | 8/2008 | Fukushima | |
| 7,413,268 B2 | 8/2008 | Kato et al. | |
| 7,497,530 B2 | 3/2009 | Bessette | |
| 7,597,161 B2 | 10/2009 | Brazier | |
| 7,625,050 B2 | 12/2009 | Bair | |
| 7,708,092 B2 | 5/2010 | Després | |
| 7,740,094 B2 * | 6/2010 | Pelletier | B62D 55/06 180/184 |
| 7,779,947 B2 * | 8/2010 | Stratton | B60T 8/175 180/197 |
| 7,784,884 B2 | 8/2010 | Soucy et al. | |
| 7,798,260 B2 | 9/2010 | Albright et al. | |
| 7,823,987 B2 | 11/2010 | Dandurand et al. | |
| 7,914,088 B2 | 3/2011 | Bair | |
| 7,914,089 B2 | 3/2011 | Bair | |
| D644,670 S | 9/2011 | Barrelmeyer | |
| 8,122,581 B1 | 2/2012 | Hurst et al. | |

(56) References Cited

U.S. PATENT DOCUMENTS

| | | | |
|---|---|---|---|
| 8,342,257 | B2 | 1/2013 | Rosenboom |
| D680,561 | S | 4/2013 | Zuchoski et al. |
| D681,071 | S | 4/2013 | Zuchoski et al. |
| D683,371 | S | 5/2013 | Aubé |
| D683,769 | S | 6/2013 | Aubé |
| 8,985,250 | B1 * | 3/2015 | Lussier ............... B62D 11/003 180/9.1 |
| 2002/0070607 | A1 | 6/2002 | Edwards |
| 2002/0140288 | A1 | 10/2002 | Herberger, Sr. et al. |
| 2002/0145335 | A1 | 10/2002 | Soucy et al. |
| 2003/0019133 | A1 | 1/2003 | Hori |
| 2003/0034189 | A1 | 2/2003 | Lemke et al. |
| 2003/0034690 | A1 | 2/2003 | Hori et al. |
| 2003/0080618 | A1 | 5/2003 | Krishnan et al. |
| 2003/0089534 | A1 * | 5/2003 | Kanzler ............... B62D 11/003 180/6.2 |
| 2004/0004395 | A1 | 1/2004 | Soucy et al. |
| 2004/0070273 | A1 | 4/2004 | Safe et al. |
| 2004/0084962 | A1 | 5/2004 | Courtemanche |
| 2004/0130212 | A1 | 7/2004 | Ishibashi |
| 2004/0135433 | A1 | 7/2004 | Inaoka et al. |
| 2005/0035654 | A1 | 2/2005 | Tamaru et al. |
| 2005/0056468 | A1 | 3/2005 | Tucker |
| 2005/0103540 | A1 | 5/2005 | Lavoie |
| 2005/0104449 | A1 | 5/2005 | Lavoie et al. |
| 2005/0104450 | A1 | 5/2005 | Gagne et al. |
| 2005/0168069 | A1 | 8/2005 | Ueno |
| 2006/0060395 | A1 | 3/2006 | Boivin et al. |
| 2006/0103236 | A1 | 5/2006 | Soucy et al. |
| 2006/0124366 | A1 | 6/2006 | Le Masne De Chermont |
| 2006/0175108 | A1 | 8/2006 | Kubota |
| 2006/0220456 | A1 | 10/2006 | Sugahara |
| 2006/0248484 | A1 | 11/2006 | Baumgartner et al. |
| 2006/0273660 | A1 | 12/2006 | Dandurand et al. |
| 2007/0046100 | A1 | 3/2007 | McGilvrey et al. |
| 2007/0075456 | A1 | 4/2007 | Feldmann |
| 2007/0126286 | A1 | 6/2007 | Feldmann et al. |
| 2007/0159004 | A1 | 7/2007 | St Amant |
| 2007/0252433 | A1 | 11/2007 | Fujita |
| 2008/0007118 | A1 | 1/2008 | Fujita |
| 2008/0073971 | A1 | 3/2008 | Paradis et al. |
| 2008/0100134 | A1 | 5/2008 | Soucy et al. |
| 2008/0136255 | A1 | 6/2008 | Feldmann et al. |
| 2008/0169147 | A1 | 7/2008 | Brazier |
| 2008/0203813 | A1 | 8/2008 | doyle |
| 2008/0211300 | A1 | 9/2008 | Matsuo et al. |
| 2008/0211301 | A1 | 9/2008 | Jee et al. |
| 2009/0085398 | A1 | 4/2009 | Maltais |
| 2009/0102283 | A1 | 4/2009 | Choi |
| 2009/0166101 | A1 | 7/2009 | Wenger et al. |
| 2009/0195062 | A1 | 8/2009 | Uchida |
| 2009/0302677 | A1 | 12/2009 | Sugihara |
| 2009/0309415 | A1 | 12/2009 | Shimozono |
| 2010/0012399 | A1 | 1/2010 | Hansen |
| 2010/0033010 | A1 | 2/2010 | Shimozono |
| 2010/0095506 | A1 | 4/2010 | Bair |
| 2010/0096915 | A1 | 4/2010 | Haigo |
| 2010/0230185 | A1 | 9/2010 | Mallette et al. |
| 2010/0253138 | A1 | 10/2010 | Desperés |
| 2010/0283317 | A1 | 11/2010 | Soucy et al. |
| 2011/0068620 | A1 | 3/2011 | Delisle et al. |
| 2011/0121644 | A1 | 5/2011 | Wellman |
| 2011/0148189 | A1 | 6/2011 | Courtemanche et al. |
| 2011/0301825 | A1 | 12/2011 | Grajkowski et al. |
| 2011/0315459 | A1 | 12/2011 | Zuchoski et al. |
| 2012/0001478 | A1 | 1/2012 | Zuchoski et al. |
| 2012/0056473 | A1 | 3/2012 | Hashimoto et al. |
| 2012/0104840 | A1 | 5/2012 | Zuchoski et al. |
| 2012/0242142 | A1 | 9/2012 | Kautsch et al. |
| 2012/0242143 | A1 | 9/2012 | Feldmann |
| 2013/0126196 | A1 | 5/2013 | Rosenboom |
| 2013/0134772 | A1 | 5/2013 | Dandurand et al. |
| 2013/0134773 | A1 | 5/2013 | Dandurand et al. |
| 2013/0162016 | A1 | 6/2013 | Lajoie et al. |
| 2014/0182960 | A1 | 7/2014 | Bedard et al. |

FOREIGN PATENT DOCUMENTS

| | | | |
|---|---|---|---|
| DE | 20207342 | 8/2002 | |
| EP | 0578504 A2 * | 1/1994 | ........... B62D 55/244 |
| EP | 1008509 | 6/2000 | |
| EP | 1211169 | 6/2002 | |
| EP | 1260429 A2 * | 11/2002 | ............ B62D 55/24 |
| EP | 1273504 | 1/2003 | |
| EP | 1283152 | 2/2003 | |
| EP | 1506913 | 2/2005 | |
| EP | 1882627 A1 * | 1/2008 | ............ B62D 55/24 |
| EP | 1953070 | 8/2008 | |
| EP | 2014542 | 1/2009 | |
| EP | 2119620 | 11/2009 | |
| JP | 0207447 | 3/1990 | |
| JP | 06-032262 | 2/1994 | |
| JP | 06-48334 | 2/1994 | |
| JP | H0623362 | 2/1994 | |
| JP | 11129946 A * | 5/1999 | |
| JP | 2000053037 | 2/2000 | |
| JP | 2003011860 A * | 1/2003 | |
| JP | 2003-089366 | 3/2003 | |
| JP | 2004330830 | 11/2004 | |
| JP | 2006-103482 | 4/2006 | |
| JP | 2007022304 | 2/2007 | |
| JP | 04-194599 | 12/2008 | |
| JP | 2009061829 | 3/2009 | |
| JP | 2009248924 | 10/2009 | |
| JP | 2010018091 | 1/2010 | |
| JP | 2010047040 | 3/2010 | |
| JP | 2010089729 | 4/2010 | |
| KR | 10-2007-0089354 | 8/2007 | |
| SU | 1446017 A2 * | 12/1988 | |
| WO | WO 2008/108439 | 9/2008 | |
| WO | WO 2009/105892 | 9/2009 | |
| WO | WO 2009/106617 | 9/2009 | |
| WO | WO 2013/002781 | 1/2013 | |

OTHER PUBLICATIONS

U.S. Appl. No. 13/112,840, filed May 2011, Delisle et al.
U.S. Appl. No. 13/325,783, filed Dec. 2011, Lussier et al.
U.S. Appl. No. 13/325,796, filed Dec. 2011, Lussier et al.
U.S. Appl. No. 13/326,010, filed Dec. 2011, Lussier et al.
U.S. Appl. No. 13/326,110, filed Dec. 2011, Zuchoski et al.
U.S. Appl. No. 13/326,132, filed Dec. 2011, Lussier et al.
U.S. Appl. No. 13/495,823, filed Jun. 2012, Kautsch.
U.S. Appl. No. 61/808,148, filed Apr. 2013, de Boe et al.
Non-Final Office Action issued by the USPTO dated Jul. 10, 2014 in connection with U.S. Appl. No. 13/424,459; 14 pp.
Non-Final Office Action issued by the United States Patent and Trademark Office dated Jun. 9, 2014 in connection with U.S. Appl. No. 13/326,132; 15 pp.
Non-Final Office Action issued by the USPTO dated Jul. 10, 2014 in connection with U.S. Appl. No. 13/326,110; 16 pp.
Non-Final Office Action issued by the USPTO dated Jul. 14, 2014 in connection with U.S. Appl. No. 13/112,840; 18 pp.
Non-Final Office Action issued by the USPTO dated Sep. 29, 2014 in connection with U.S. Appl. No. 13/325,783; 27 pp.
Non-Final Office Action issued by the USPTO dated Sep. 22, 2014 in connection with U.S. Appl. No. 13/325,796; 25 pp.
Camoplast Inc., "ATV/UTV Track Systems", 2009-2010 Catalog, 8 pp.
Brooks, Linda G., "Office Action", U.S. Appl. No. 29/405,414, dated Nov. 9, 2012, 8 pp.
Brooks, Linda G., "Office Action", U.S. Appl. No. 29/405,416, dated Nov. 9, 2012 , 8 pp.
Brooks, Linda G., "Office Action", U.S. Appl. No. 29/405,417, dated Nov. 9, 2012, 9 pp.
International Search Report and Written Opinion; PCT/CA2013/000864; dated Jan. 31, 2014; 8 pp.
CAN-AM BRP, "Parts & Accessories—Track System", Parts, Accessories & Riding Gear catalogue, p. 66 (2011).
Story by Staff, BRP upgrades Apache ATV track system for Outlander—Apache system features larger footprint and power steering mode,

(56) References Cited

OTHER PUBLICATIONS atv.com, http://www.atv.com/news/brp-upgrades-apache-atv-track-system-for-outlander-1481.html 2 pp. (Nov. 24, 2009).
Bair Products, Inc., "Larry Lugs—Patented Bolt-On Replacement Drive Lugs", http://www.bairproductsinc.com/products/larly_lugs.html, Jan. 1, 2011, 2 pp.
Red Roo Solutions PTY LTD—World Class Solutions for the Earth Moving Industry, "Save thousands of dollars and add thousands of hours to your tracks with Larry Lugs", http://www.redroosolutions.com.au/larrylugs.html, Jun. 8, 2009, 3 pp.
Extended European Search Report and Written Opinion; dated Sep. 13, 2013; EP 10835318.6; 8 pp.
International Search Report, International Application No. PCT/CA2010/000632, dated Jul. 21, 2010, 3 pp.
Written Opinion of the International Searching Authority, International Application No. PCT/CA2010/000632, dated Jul. 21, 2010, 4 pp.
Bridgestone Industrial Products America, Inc., "Stay on the Right Track. Rubber Tracks for Track Loaders", Brochure 2009, 6 pp.
Bridgestone Industrial Products America, Inc., "Stay on the Right Track. New Generation Features Rubber Tracks for Excavators", Brochure 2009, 12 pp.
Notice of Allowance issued by the USPTO dated Mar. 4, 2015 in connection with U.S. Appl. No. 13/325,783; 13 pages.
Final Office Action issued by the USPTO dated Mar. 5, 2015 in connection with U.S. Appl. No. 13/325,796; 33 pages.
Non-Final Office Action issued by the USPTO dated Jan. 11, 2017 in connection with U.S. Appl. No. 14/886,327, 11 pages.
Non-Final Office Action issued by the USPTO dated Feb. 21, 2017 in connection with U.S. Appl. No. 14/721,236, 12 pages.

\* cited by examiner

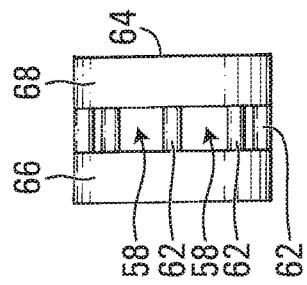
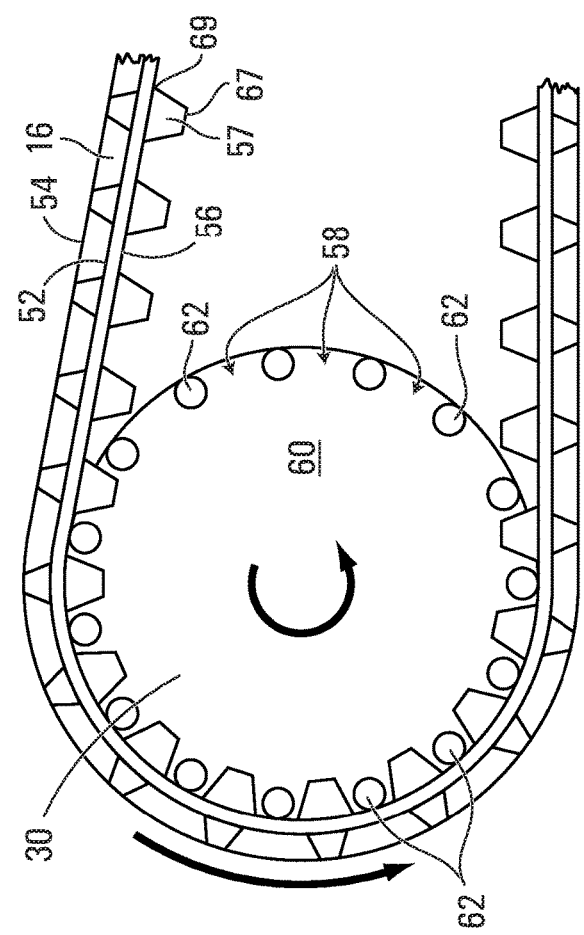
FIG. 3
FIG. 2

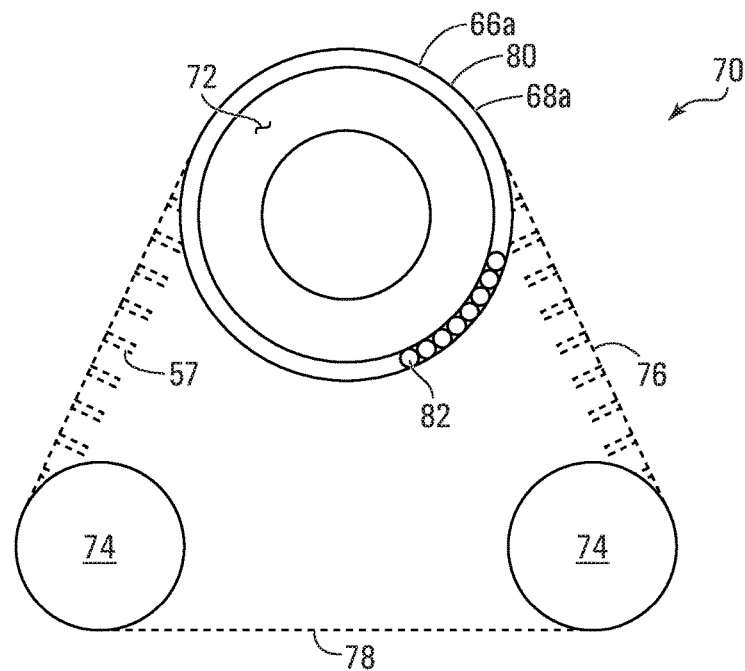
FIG. 4
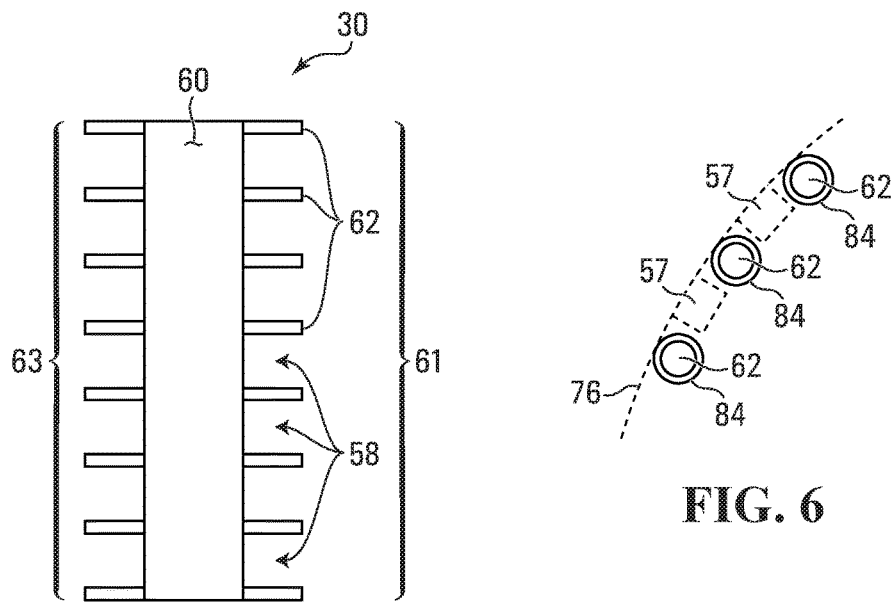
FIG. 5
FIG. 6

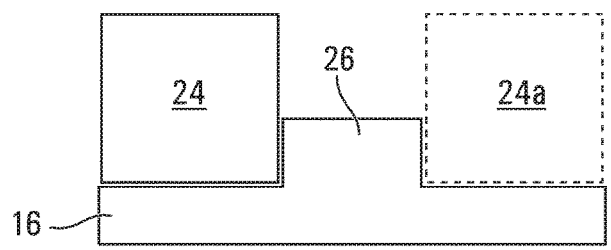
FIG. 32
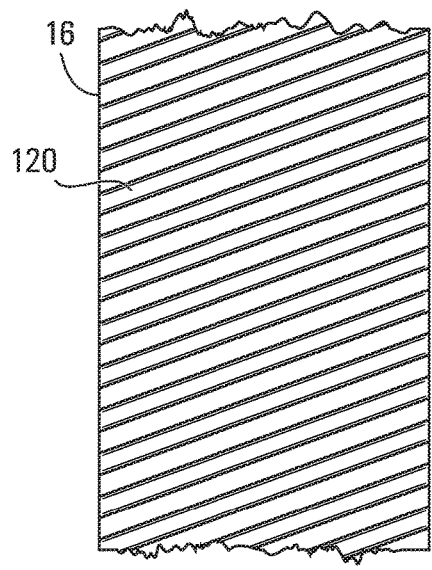 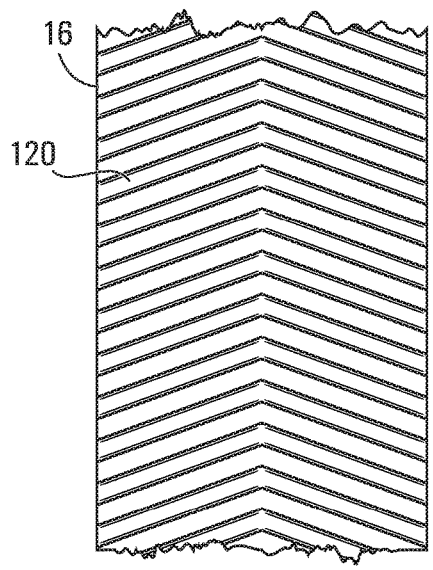
FIG. 33  FIG. 34

DRIVE SPROCKET, DRIVE LUG CONFIGURATION AND TRACK DRIVE ARRANGEMENT FOR AN ENDLESS TRACK VEHICLE

CROSS-REFERENCE TO RELATED APPLICATION

This application is a continuation of U.S. patent application Ser. No. 13/326,278, filed on Dec. 14, 2011; which claims the benefit under 35 USC 119(e) of U.S. Provisional Patent Application No. 61/422,947, filed on Dec. 14, 2010 and U.S. Provisional Patent Application No. 61/426,979, filed on Dec. 23, 2010. Each application is hereby incorporated by reference herein.

FIELD OF THE INVENTION

The present invention relates to tracked vehicles in general and more specifically to improvements in drive sprockets, drive lug configurations and track drive arrangements for tracked vehicles.

BACKGROUND

Tracked vehicles, such as heavy agricultural or construction equipment, that routinely operate in rough environments may suffer from rapid track deterioration. As a result of this track deterioration, the track must be replaced or repaired which is expensive and significantly increases the cost of operation of the vehicle over time.

Tracks, especially rubber tracks are subjected in use to different wear patterns that depend largely on the intensity and the type of use of the vehicle. One specific point of failure of the rubber track is the drive lugs. The drive lugs are used to establish a positive drive connection between the track and the drive sprocket. Accordingly, when the track operates at high loading levels, a significant amount of stress is exerted on the drive lugs to impart movement to the track. Over time, this amount of stress can damage the drive lugs ultimately leading to drive lug separation from the track carcass.

SUMMARY OF THE INVENTION

As embodied and broadly described herein the invention provides a sprocket for a tracked vehicle, the sprocket having a plurality of sockets for engaging drive lugs on an inner surface of a track driven by the sprocket, the sprocket also including a support surface for engaging with an inner surface of the track and which is in rolling contact with the inner surface of the track.

As embodied and broadly described herein the invention also provides a sprocket for a tracked vehicle the sprocket having a plurality of sockets for engaging drive lugs on an inner surface of a track driven by the sprocket, the sprocket also including a support surface for engaging with an inner surface of the track and which has a coefficient of friction less than about 0.1.

As embodied and broadly described herein the invention yet provides a sprocket for a tracked vehicle the sprocket having a plurality of sockets for engaging drive lugs on an inner surface of a track driven by the sprocket, the sprocket also including a support surface for engaging with an inner surface of the track and which has a coating of low friction material.

As embodied and broadly described herein the invention also provides a sprocket for a tracked vehicle having a support surface for engaging with an inner surface of the track and an actuator to selectively (1) lock the support surface to the sprocket to engage a friction drive assist mode or (2) unlock the support surface with relation to the sprocket to disengage the friction drive assist mode.

As embodied and broadly described herein the invention provides a sprocket for a tracked vehicle, the sprocket having a plurality of sockets for engaging drive lugs on an inner surface of a track driven by the sprocket, the sprocket including a removable component to laterally open one or more of the sockets such as to allow the track and the drive lugs to be removed from the sprocket by sliding them out along an axis of rotation of the sprocket.

As embodied and broadly described herein the invention provides an endless track having an outer ground engaging surface, an inner surface opposite the outer ground engaging surface and a plurality of drive lugs projecting from the inner surface, one or more of the plurality of drive lugs having opposite lateral extremities and a driving face extending between the lateral extremities for engagement by a sprocket in order to propel the track, the driving face having a projection intermediate the lateral extremities.

As embodied and broadly described herein, the invention further provides in combination:
  a drive sprocket having a generally circular configuration with a generally cylindrical peripheral surface;
  a plurality of spaced apart drive pins or bars defining on the cylindrical peripheral surface recessed sockets;
  an endless track having an outer ground engaging surface, an inner surface opposite the outer ground engaging surface and a plurality of drive lugs projecting from the inner surface for engagement in respective ones of the sockets, one or more of the plurality of drive lugs having opposite lateral extremities and a driving face for engagement by a respective drive pin or bar, the drive pin or bar having a recessed portion and the driving face having a projection that engages the recessed portion when the drive pin or bar engages the driving face.

As embodied and broadly described herein, the invention provides a sprocket arrangement for an endless track, comprising a central hub defining an internal cavity in which are mounted one or more gears for driving the hub. A rim structure is integrally formed with the hub, the rim structure including a plurality of peripherally disposed sockets for receiving drive lugs projecting from an internal surface of the track.

As embodied and broadly described herein, the invention further provides a sprocket arrangement for an endless track, comprising a plurality of peripherally disposed drive pins defining between them sockets for receiving drive lugs projecting form an inner surface of the track, one or more of the drive pins including a core member and a wear jacket to protect the core member from wear as a results of repeated contact with the track.

As embodied and broadly described herein the invention further includes a sprocket arrangement for an endless track, comprising a plurality of components defining a rim portion of the sprocket, the plurality of components being radially moveable to vary a diameter of the sprocket.

As embodied and broadly described herein, the invention further provides a sprocket arrangement for an endless track, comprising a plurality of components defining a plurality of peripheral sockets for receiving drive lugs of the endless track, the plurality of components being selectively moveable to vary a pitch of the sprocket.

As embodied and broadly described herein the invention also provides a sprocket arrangement for an endless track, comprising a plurality of drive pins defining between them a series of peripherally disposed sockets for receiving drive lugs of the endless track, the plurality of drive pins capable of resiliently yielding in when engaged by respective drive lugs.

As embodied and broadly described herein the invention provides a track drive system comprising an endless track; and a sprocket in a driving engagement with the track, the driving engagement including a first positive drive engagement and second positive drive engagement.

In a specific and non limiting example of implementation the first positive drive engagement includes a first set of teeth on the track for engaging corresponding sockets on the sprocket.

In a specific example of implementation the second positive drive engagement includes a second set of teeth on the track for engaging corresponding sockets on the sprocket, wherein the first set of teeth is distinct from the first set of teeth.

In a specific example of implementation the first set of teeth and the second set of teeth have different pitches.

BRIEF DESCRIPTION OF THE DRAWINGS

A detailed description of examples of implementation of the present invention is provided hereinbelow with reference to the following drawings, in which:

FIG. 2 is a side view of a sprocket arrangement used for driving a rubber track, showing the relationship between the drive lugs of the track and the sprocket bars;

FIG. 3 is a front elevational view of an alternative sprocket configuration where the cavities for receiving the drive lugs of the track are located in the center of the sprocket;

FIG. 4 is a side elevational view of an alternative endless track arrangement for an agricultural vehicle;

FIG. 5 is a plan view of an alternative drive sprocket configuration.

FIG. 6 is an enlarged fragmentary cross sectional view of the sprocket of FIG. 4 illustrating a possible variant.

FIG. 32 is a cross-sectional view taken along lines 32-32 in FIG. 29;

FIGS. 33 and 34 are plan views of the inner surface of the track illustrating alternative teeth patterns;

FIG. 37 shows an embodiment of a sensor provided with a wireless transmitter; and FIG. 38 shows an embodiment of a drive wheel with a locking device.

Figure 1:
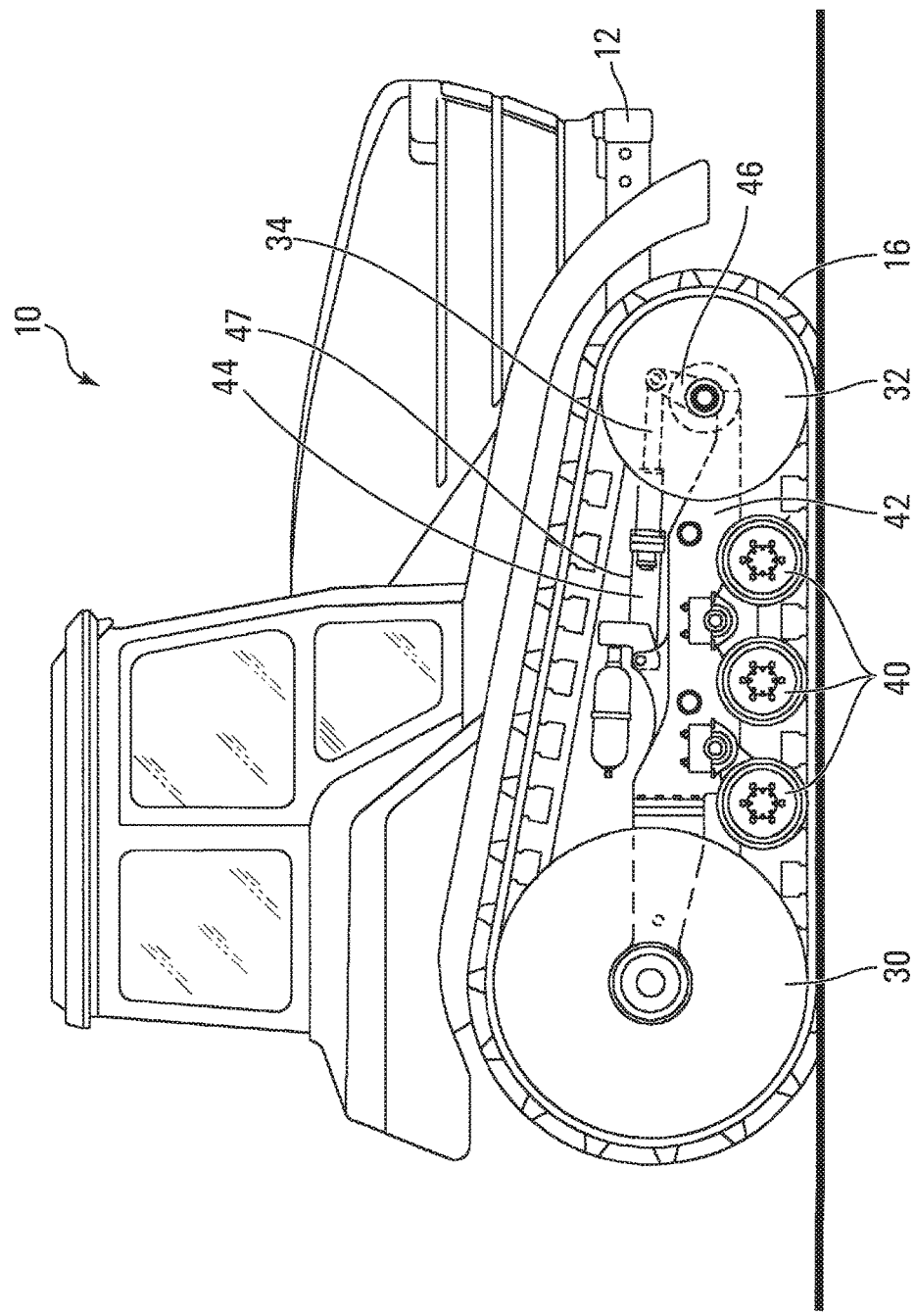
FIG. 1 is a side elevational view of an agricultural vehicle using a rubber track.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 is a side elevational view of an agricultural vehicle which uses a rubber track. The vehicle 10 has an upper body including a cabin for the operator and housing for the power train. The power train can include an engine which can be an internal combustion engine. Alternatively, the engine can include an electric motor. The power train also includes a transmission coupled to the engine. The transmission would typically include a gearbox with clutches allowing controlling the application of drive power to the track.

The vehicle 10 has an undercarriage 12 including a set of wheels about which is tensioned a track 16. The set of wheels has a drive wheel 30 and an idler wheel 32. In a variant, both wheels 30, 32 can be driven. In a yet another variant only the front wheel 32 can be driven. In a further variant described below the undercarriage has several idler wheels.

The track 16 is mounted on the wheels 30, 32 such that as the wheels 30, 32 turn, the track is caused to move. The undercarriage also includes a set of rollers 40 which are mounted between the wheels 30, 32 in order to keep the run of the track 16 between the wheels 30, 32 in contact with the ground. The rollers 40 are mounted on a suspension system 42 allowing the rollers 40 to yield upwardly when the vehicle 10 rides over obstacles.

The undercarriage 12 further includes a tensioning system 44 to tension the track 16. The tensioning system 44 operates hydraulically and includes a hydraulic ram mounted between a fixed portion of the undercarriage and a short arm 46 to which the wheel 32 is pivotally connected. The hydraulic ram includes a casing defining a cylinder bore 47 in which is slidingly mounted a piston 34. As the piston 34 of the hydraulic ram extends, this causes the short arm 46 to move and change the position of the wheel 32 with relation to the wheel 30. If the hydraulic ram is extended, the wheel 32 will move further away from the wheel 30, thus increasing the tension in the track 16. Conversely, if the hydraulic ram is retracted, the opposite effect takes place and the tension in the track 16 diminishes.

Note that the tensioning system 44 can operate electrically or mechanically instead of hydraulically.

FIG. 2 illustrates in greater detail the mechanical relationship between the track 16 and the wheel 30. In this example of implementation, the wheel 30 works as a sprocket and engages drive lugs 57 on the track 16. Specifically, the track 16 has a carcass 52 having an outer face 54 and an inner face 56. Drive lugs 57 are mounted to the inner face 56. The drive lugs 57 are made from rubber material and are located at equally spaced intervals from one another. The drive lugs 57 fit in respective sockets 58 formed around the periphery of the sprocket 30. The dimensions of the sockets 58 and their spacing matches those of the drive lugs 57, such that as the sprocket 30 turns the drive lugs 57 mesh with the respective sockets 58.

The sprocket 30 that is shown in FIG. 2 includes a central disk-like structure 60 from which axially project a series of drive pins 62 defining between them the sockets 58. Accordingly, the sprocket 30 has two series of drive pins 62 one on each side of the disk-like structure 60. This arrangement allows using on the track 16 two series of drive lugs 57, each series meshing with a respective set of pins 62. FIG. 5 illustrates a front view of the sprocket 30, better showing the drive pins 62 which define the sockets 58. Note that in this arrangement the track is provided with drive lugs 57 arranged in two sets that extend parallel to one another along the internal surface of the track 16, leaving between them a space to receive the central disk-like structure 60 from which caries the drive pins 62. In particular, one set of the drive lugs 57 mesh with the drive pins 62 on one side of the central disk-like structure 60 (identified in the drawing by 61) while the other set of drive lugs 57 mesh with the drive pins 62 on the side 63 of the central disk-like structure 60.

The spacing between the sets of drive lugs 57 is selected such as to accommodate the width of the central disk-like structure 60. The central disk-like structure 60 has a smooth external surface and engages a corresponding smooth portion of the internal surface of the track 16. This allows the central disc-like structure to provide support for the track 16 and thus more evenly spread the loading on the internal surface of the track 16. Without such larger support surface, the track tension force will be distributed over the narrow area defined by the pins 62, which may be detrimental to the long term durability of the track 16.

While in practice the dimensions of the central disc-like structure 60 can vary depending on the specific application, it has been found that a disk like structure 60 having generally a width in the range of from about 40% to about 95% of the track width, preferably in the range of about 45% to about 95% and even more preferably from about 65% to about 95% of the track width, works well. For clarity, the width of the disk like structure is measured along the rotational axis of the sprocket 30, excluding the drive pins 62.

An alternative arrangement of the sprocket is shown in FIG. 3, which illustrates a front view of a sprocket 64, where the sockets 58 are formed in the center of the sprocket 64. In this arrangement the track 16 (not shown) has a single row of drive lugs 57, which are centrally located and mesh with the sockets 58. In this form of construction, the sprocket 64 includes a pair of discs 66, 68 that are spaced apart and connected to one another via the pins 62 which define between them the sockets 58. In this example, the discs 66, 68 are smooth surfaced and they engage corresponding smooth surfaced portions of the inner surface of the track, on either side of the row of drive lugs 57. As in the case with the previous embodiment, the discs 66, 68 contribute to support the track and prevent that the track tension is concentrated only on the drive pins 62. Again, in this instance the combined width of the discs 66, 68 is in the range of from about 40% to about 95% of the track width, preferably in the range of about 45% to about 95% and even more preferably from about 65% to about 95% of the track width.

The sprocket 30, 64 can transmit motion to the track 16 by two different mechanisms. The first is the friction drive mode and the second is the positive drive mode. During the friction drive mode, the friction developed between the peripheral surfaces of the discs 66, 68 and the flat inner surface of the track, which engages those surfaces is sufficient to drive the track. The tension which is built in the track 16 by operation of the tensioning system 44 can produce a significant amount of friction which is sufficient to drive the track 16. During the friction drive mode, the drive lugs 57 mesh with the sockets 58 but there is little pressure or strain acting on drive lugs 57.

Beyond a certain degree of power loading, the friction drive mode transitions to the positive drive mode. The reaction force operating on the track 16 as the vehicle 10 moves can overcome the friction between the track 16 and the peripheral surfaces of the discs 66, 68. This produces a small degree of slip between the peripheral surfaces of the discs 66, 68 until the drive lugs 57 firmly engage the pins 62. At that point no further slip is possible and the driving force is communicated to the track mostly via the drive lugs 57.

There are possible advantages to designing the sprocket such that it operates mostly in the positive drive mode, thus limiting the friction drive mode as much as possible. One such reason is proper engagement of the drive lugs 57 with the sockets 58. When the track 16 operates in the positive drive mode, the degree of tension in the track is high. The track 16 stretches to a small but measurable degree thus extending the spacing between the drive lugs 57, which effectively changes the pitch of the drive lugs. In addition, the drive lugs 57 which are in engagement with the sprocket 30, 64 also resiliently distort to some degree during engagement with the sockets 58, thus further altering the pitch. For that reason, the design of the sprocket 30, 64 in particular the spacing between the sockets 58 is a compromise design such that a proper engagement will occur with the drive lugs 57 and the sockets 58 both during the friction drive mode and the positive drive mode. Basically, the pitch of the sockets 58 is designed such that it can accommodate a slight variation in pitch of the drive lugs 57 on the track 16.

A more efficient sprocket design would be one where the pitch of the sprocket is designed to match a stable pitch of the track drive lugs 57.

In a specific and non-limiting example of implementation, the sprocket 30, 64 is designed to reduce as much as possible the friction drive mode. In a first embodiment, the surfaces 66, 68 engage the inside of the track in a rolling contact arrangement. FIG. 4 which illustrates this embodiment also illustrates an alternative track drive configuration which can be used as a conversion to retrofit a wheel based vehicle to tracked vehicle. The drive arrangement 70 includes a drive sprocket 72 and a pair of idler wheels 74 creating a triangular track pathway. An rubber track 76 is mounted on the sprocket 72 and the idler wheels 74. The track run 78 between the idler wheels 74 is the ground engaging run on which the vehicle is supported. The track 76 is otherwise similar to the track 16 in that it has drive lugs 57 used to positively engage the sprocket 72.

In this first embodiment the sprocket 72 uses centrally located sockets which engage respective drive lugs 57 of the track 76, similar to the arrangement illustrated at FIG. 3. That sprocket 72 provides on each side of the row of sockets two support surfaces 66a, 68a that engage the inside of the track 76. The support surfaces 66a, 68a engage the track 16 in a rolling contact. This is achieved by providing on the sprocket 72 a pair of axially spaced apart outer rings 80 that define at their outer periphery the support surfaces 66a, 68a and which engage the inside of the track 76. The outer rings are rotatably mounted on the sprocket core via rollers or any other suitable friction reduction arrangement. In this fashion, the outer rings 80 constitute the outer races of a bearing structure that rolls on the sprocket core.

The arrangement shown in FIG. 4 is designed such that the outer rings 80 can turn on the sprocket core freely in clockwise direction as well as in the counterclockwise direction. It may be desirable for some applications to allow the outer rings to turn freely (thus limit or negate the friction drive mode) only when the vehicle moves in one direction, say the forward direction. The friction drive mode would thus be maintained when the vehicle moves in the rearward direction. This unidirectional angular motion of the outer rings 80 can be achieved by providing the sprocket with a suitable agent (not shown in the drawings) that blocks the rotational motion of the outer rings 80 in a predetermined direction while permitting the movement in the opposite direction. This agent can be purely mechanical in nature, electrical, hydraulic, pneumatic or a combination thereof. An example of a mechanical agent is a ratcheting mechanism that uses spring biased teeth or pawls that retract when the outer rings 80 are turned in direction in which motion is permitted but fail to retract when rotation in an opposite direction is attempted, thus angularly locking the outer rings 80 to the sprocket core. Another possible implementation is to use locking friction pads, similar to a brake mechanism, that are retracted, thus allowing the outer rings 80 to rotate, but which can be extended, either electrically, mechanically, pneumatically or hydraulically to lock the outer rings 80 to the sprocket core. The locking friction pads are mounted to the sprocket core underneath the outer rings 80. When it is desired to allow the outer rings 80 to freely turn on the sprocket core, the locking friction pads are kept in their retracted position, out of contact with the outer rings 80. To block rotation the locking friction pads are extended radially until they engage the outer rings 80, preventing any further angular motion in any direction. This arrangement has the advantage of allowing more control freedom by selecting in real time the direction in which the outer rings 80 are allowed to turn or not turn in any direction. For such implementation, the arrangement is preferably under computer control using sensors to detect operational conditions and logic which establishes when to lock the outer rings 80. When the logic decides to lock the outer rings 80, it issues a control signal to the actuate the system driving the locking friction pads into engagement with the outer rings 80. This system is described in greater detail later, in relation to FIGS. 8 and 9.

Instead of using rollers 82 to allow the rotational movement of the outer rings 80 with relation to the sprocket core, the outer rings 80 can be mounted on the sprocket core such that the two components rotate one with relation to the other via a low friction interface, somewhat like a bushing arrangement. In this variant, the sprocket core has outer cylindrical surfaces on which are mounted the respective outer rings 80. A low friction material coating is provided on the outer cylindrical surfaces which provides a low friction contact interface such that the outer rings 80 can turn relatively freely on the sprocket core and maintain the rolling engagement with the track 76. Examples of low friction coatings that can be applied on one surface or both surfaces of the interfaces include polytetrafluoroethyle, urethane or any other suitable polymeric coating. A brass coating or insert is yet another possibility. In the event the low friction material can be used in conjunction with a lubricant, the material can be designed to carry a certain volume of the appropriate lubricant, such as oil or grease. For instance, the material can be made porous to hold a certain amount of lubricant.

With the above arrangement, the pins 62 are the only remaining component of the sprocket that engage the inner surface of the track 76 in a sliding contact (to the extent permitted by the play existing when the drive lugs 57 engage the pins 62). To reduce this sliding contact, the pins 62 can also be provided with rolling surfaces, as is illustrated at FIG. 6. In FIG. 6, the pins 62 are shown in cross-section and each pin carries a bushing 84 that is rotatably mounted on the pin 62 such as to create the desirable rolling contact with the portion of the track 76 that engages the pin 62/bushing 84. Instead of using a bushing 84, a bearing structure similar to the outer ring 80 shown in FIG. 4 can be used.

In a second possible embodiment, the friction drive mode is limited by providing the outer surface of the sprocket 72 with a treatment to reduce significantly the friction between the outer surface of the sprocket 72 and the inner surface of the track 16. In this embodiment, the sprocket 72 will include a core made of metallic material, coated with a different material that manifests a lower degree of friction with the inner surface of the track than the metallic material. In a specific example, the low friction treatment yields a coefficient of friction on the outer surfaces 66*a*, 68*a* of the sprocket 72 of less than about 0.1, preferably less than about 0.05 and even more preferably of less than about 0.01. The treatment may include the deposition on the outer surfaces 66*a*, 68*a* of the sprocket 72 a low friction material coating. In this example, the sprocket 72 engages with the inner surface of the track 76 via sliding contact (again to the extent permissible by the play allowed by the drive lugs 57 in the respective sockets). However, the sliding contact occurs at low power loadings and the system quickly transitions to the positive drive mode. Examples of low friction material can include polytetrafluoroethyle, brass plating and UHMW polyurethane, among others. It is possible to coat the entirety of the outer surfaces 66*a*, 68*a* of the sprocket 72 with the low friction material. Another option is to selectively coat the surfaces, such as coat only the surfaces 66*a* and 68*a* but not the pins 62. Yet another possibility is to apply a pattern of low friction material on the surfaces 66*a*, 68*a*, such as blocks of low friction material spaced apart from one anther and interspersed with areas that area uncoated and thus manifest a higher degree of friction with the inside surface of the track 76. Yet another possibility is to apply on the surfaces 66*a*, 68*a* of the sprocket 72 different types of low friction material. The coating pattern will depend on the desired degree of friction reduction between the sprocket 72 and the track 76.

In a possible variant, the sprocket arrangement illustrated in FIG. 4 is operated such as to selectively invoke or deactivate a friction drive assist that can be combined to the positive drive mode in order to potentially reduce the loading on the drive lugs 57.

This can be accomplished by providing the sprocket arrangement 72 with a device 71 to lock the outer rings 80 to the sprocket core such that the outer rings 80 can no longer turn on the sprocket core, as shown in FIG. 38. Examples of devices that can accomplish this function were discussed earlier. When the outer rings 80 are blocked against rotation in this fashion, the smooth surface of the track is no longer in rolling contact with the sprocket 72. Rather, the engagement is a frictional engagement which contributes to propel the track. Accordingly, the loading that propels the track is no longer concentrated on the drive lugs 57 alone since some of the driving force is channeled through the friction engagement.

The friction drive mode is essentially an assist that can be invoked during modes of operation in which the drive lugs 57 are subjected to high loading. Those modes of operation may arise when the vehicle climbs steep grades, pulls heavy loads or more generally requires a significant level of torque input in order to perform a certain task.

Figure 7:
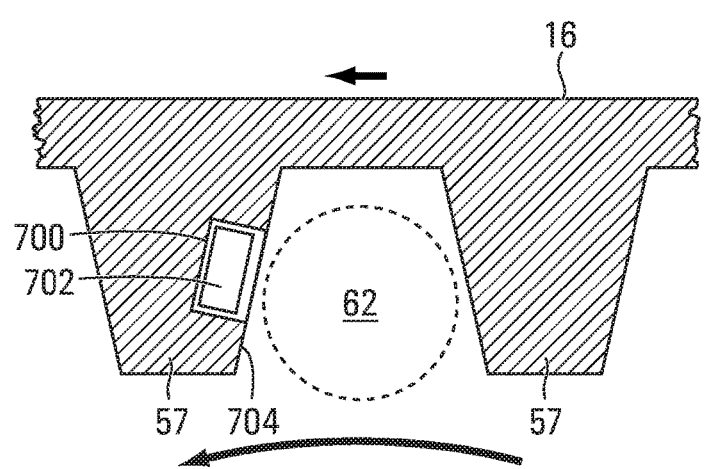
FIG. 7 is an enlarged side view of a track illustrating the location of a pressure sensor in a drive lug.

In order to determine the degree of loading on the drive lugs 57 it is possible to use a pressure sensor in the individual drive lugs 57. Each drive lug 57 or only some of the drive lugs 57 can be provided with pressure sensors to detect the pressure applied on the drive lugs 57 by the sprocket 30, 64, 72. The pressure sensor can be any type of pressure sensor suitable to provide a pressure reading when pressure is applied on one of the faces of the drive lug 57, the one that is engaged by a pin 62. Accordingly, as the pin 62 presses on the face of the drive lug 57, the pressure is sensed by the pressure sensor and an output signal is generated. FIG. 7 illustrates a possible example of implementation of a drive lug 57 in which is mounted a pressure sensor. To this end, the drive lug 57 can be designed with a suitable cavity 700 in which the pressure sensor 702 can be located. The pressure sensor 702 has a sensing part that is adjacent the face 704 of the drive lug 57 which is engaged by the pin 62. A battery can power the pressure sensor 702 and it is provided with a transmitter 69 as shown in FIG. 37 to wirelessly report pressure values to a receiver mounted on the undercarriage or at any other suitable location on the vehicle 10.

Advantageously, when multiple pressure sensors 702 are provided on the track 16, each pressure sensor 702 being mounted to a respective drive lug 57, each pressure sensor 702 is uniquely identified such that its pressure reading can be distinguished from pressure readings of other pressure sensors 702. Digitally encoding the pressure value reported by the pressure sensor 702 and appending to the pressure value a unique identifier can accomplish this. In this fashion, the receiver and the data processing unit that performs the analysis of the pressure values reported by the pressure sensors 702 can associate received pressure values to respective drive lugs 57.

Figure 36:
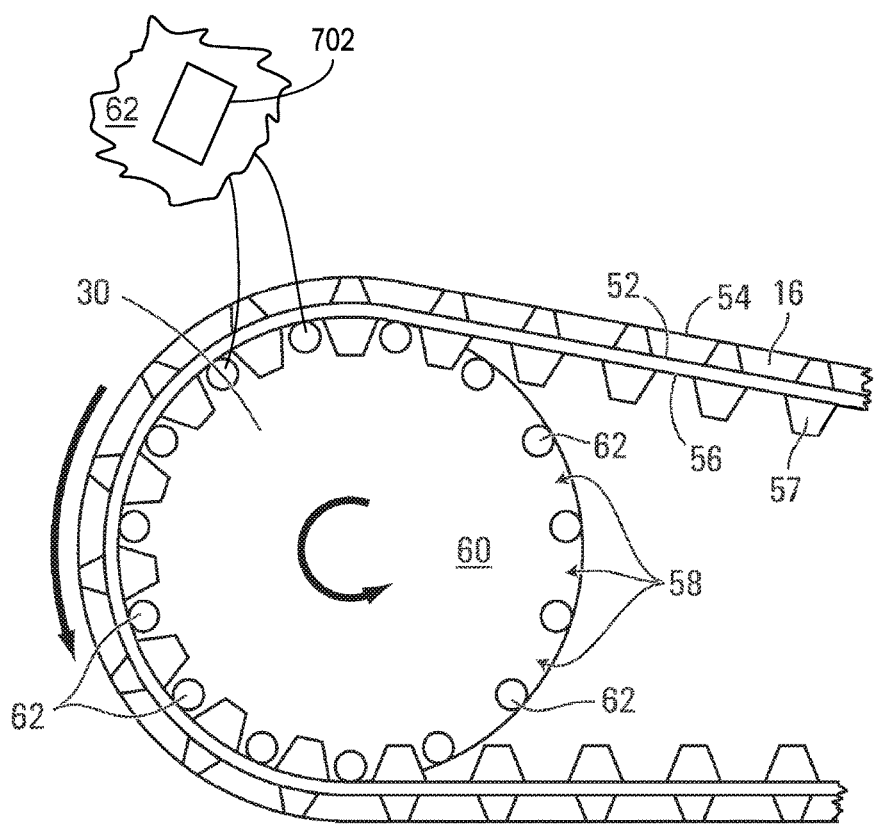
FIG. 36 shows an embodiment of a drive wheel with a sensor.

In an alternative embodiment as shown in FIG. 36, the pressure sensors 702 can be mounted to the sprocket 30, 64, 72, instead of being mounted to the drive lugs 57. In this fashion, the track 16 has no pressure sensing capability. The pressure sensors 702 are mounted on the sprocket 30, 64, 72 at locations that engage the drive lugs 57. In the examples of the sprockets described earlier, this would be the pins 62. The pins 62 are provided with cavities 700 in which the pressure sensors 702 are mounted such that when the pins 62 engage the drive lugs 57, pressure registers on the pressure sensors 702.

A receiver (not shown) mounted on a suitable location on the vehicle 10 picks up the output of the pressure sensor 702. The signal is processed by a data processing device that will determine the loading on the drive lugs 57 and will then generate a control signal to selectively activate or deactivate the friction drive component.

Yet another possible way of implementing a pressure or loading sensor is to use a torque sensor in the power train that determines the amount of torque that is being applied on the sprocket 30, 64. Since the torque applied on the sprocket 30, 64 is directly related to the track 16 loading, then by reading the torque it is possible to deduce the amount of pressure acting on the drive lugs 57.

Yet another possibility is to use a drive lug loading sensor which indirectly determines the drive lug loading by observing the operational condition of the engine of the vehicle 10 and derives the amount of power, hence torque that is being produced. In this method of implementation the drive lug loading sensor uses a computer implemented engine parameters map that correlate engine parameters to torque produced by the engine. Possible engine parameters include RPM, throttle opening percentage, intake manifold pressure, amount of fuel being injected, temperature and ignition timing among others.

Accordingly the system can determine the torque generated at any given moment by searching the map on the basis of the current engine parameters to identify the corresponding torque value. Once the torque produced by the engine is known, the torque value applied on the sprocket 30, 64, 72 can be derived on the basis of the gear ratio that is being used to transmit the drive power from the engine to the sprocket 30, 64, 72.

Figure 8:
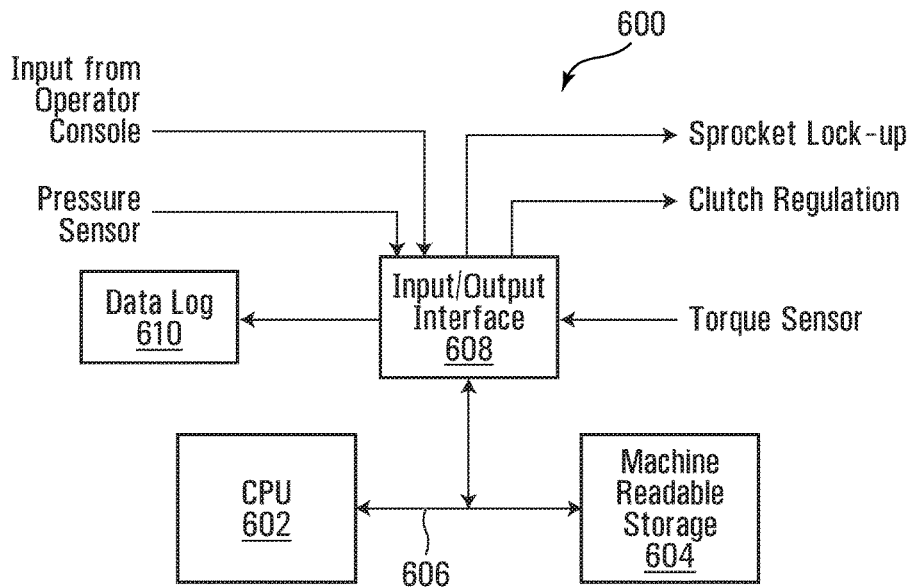
FIG. 8 is block diagram of a computing platform for generating control signals to selectively actuate or de-actuate the friction drive assist mode.

FIG. 8 illustrates a block diagram of a non-limiting example of implementation of a data processing device 600. The data processing device 600 that is mounted on the vehicle is a computing platform having a CPU 602 that communicates with a machine-readable storage device 604 over a data bus 606. An input/output interface 608 connects to the data bus 606. Input signals that convey data to be processed by the data processing device 600 are received at the input/output interface 608. Similarly, output signals directed to components of the vehicle 10 which are controlled by the data processing device 600 also transit via the input/output interface 608.

The machine-readable storage medium 604 is encoded with software that is executed by the CPU 602. The software performs the processing of the inputs signals and generates output control signals on the basis of a control strategy.

The input signals that are applied to the input/output interface 608, include:

The output of the pressure sensor. As discussed previously, the pressure sensor 702 reports the degree of loading acting on the drive lugs 57. The signal stream, in addition to conveying pressure information can also convey the identifier of the respective pressure sensor 702 that has generated the data, when multiple pressure sensors 702 are being used;

Output from operator console. This signal is generated in response actuation of a control by the operator. The control may be a mechanical control such as lever or button or may be an electronic control. The control conveys a command to the data processing device 600 to control the vehicle in a predetermined fashion, by using as an input the pressure sensor 702. An example of possible control includes enabling the engagement of the friction drive component and the trigger point at which the friction drive component will be engaged. The trigger point can be the maximal degree of drive lug loading desired above which a friction drive assist is to be used.

Torque information. In one example the torque information is provided by a torque sensor indicating the torque acting on the sprocket 30, 64, 72 and that is in turn acting on the track 16. The degree of torque applied on the sprocket 30, 64, 72 determines to a large degree the degree of loading on the drive lugs 57 and in that sense it can be an alternative to the pressure sensor information. Note that instead of using a torque sensor, the torque information can be derived by correlating the engine parameters to the torque value, as discussed above.

The output signals that are released by the input/output interface 608 are as follows:

Sprocket lock-up. Controls the operation of a lock-up device to prevent the outer ring 80 from rotating on the sprocket 30, 64, 72 in order to engage the friction drive assist mode.

Figure 9:
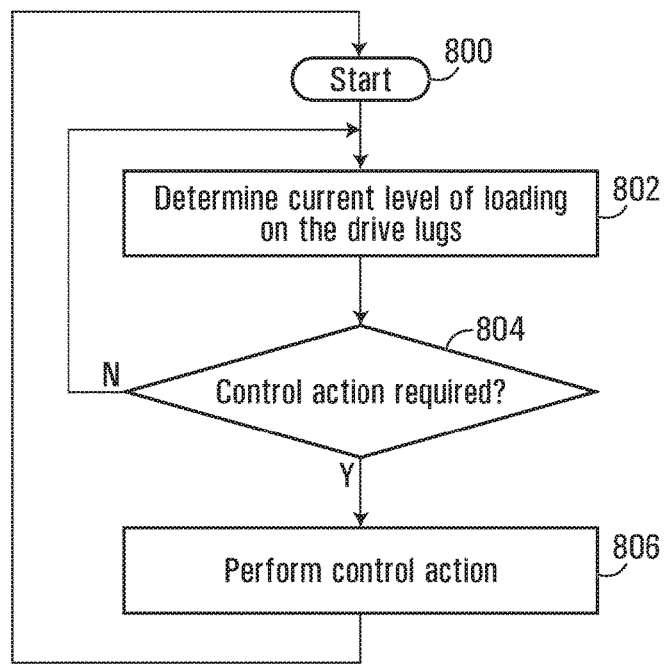
FIG. 9 is a flowchart of a process for managing the friction drive assist mode of the vehicle.

The information that is received by the various inputs of the data processing module 600, in particular the input from the operator console, the pressure sensor 702 and the torque sensor is processed by software stored in the machine readable storage 604 in order to generate control signals that will manage the friction drive assist of the track 16. The logic built in the software determines the control strategy that will be implemented. One example of a control strategy is to engage the friction drive assist when the loading on the drive lugs 57 exceeds a certain threshold. A flowchart of the process that achieves this function is illustrated in FIG. 9. The process starts at 800 and determines at step 802 the degree of loading on the drive lugs 57. As discussed earlier, this can be done by reading the output of the pressure sensor(s) 702, the torque sensor or via the engine parameters. The result is then compared to a threshold at step 804. If the loading on the drive lugs 57 is too high the conditional step is answered in the affirmative and execution then proceeds to step 806 in which a control action is performed. The control action is to engage the sprocket lock-up device in order to lock the outer ring 80 to the sprocket 30, 64, 72 such that the outer ring 80 can no longer turn on the sprocket 30, 64, 72.

An example of such lock-up device is a set of locking friction pads, similar to brake pads that are mounted to the sprocket core and operate to engage the outer rings 80. Thus, when no friction assist is desired the locking friction pads are retracted and allow the outer rings 80 to freely rotate about the sprocket core. However, when the friction drive assist is desired the locking friction pads are actuated by extending them radially outwardly of the sprocket core such that they engage the inner surface of the outer rings 80, thus preventing the outer ring 80 from rotating about the sprocket core. In this fashion, the outer rings 80 are locked with relation to the sprocket core and provide a friction drive assist.

Those skilled in the art will appreciate that when the track 16 is worn out, a track replacement operation needs to be performed. If effectuated using a prior method, this operation can be complicated and time consuming since it requires the removal and subsequent re-installation of the idler wheels 74 and possibly other components of the track support system in which the drive lugs 57 of the track are engaged.

Figure 10:
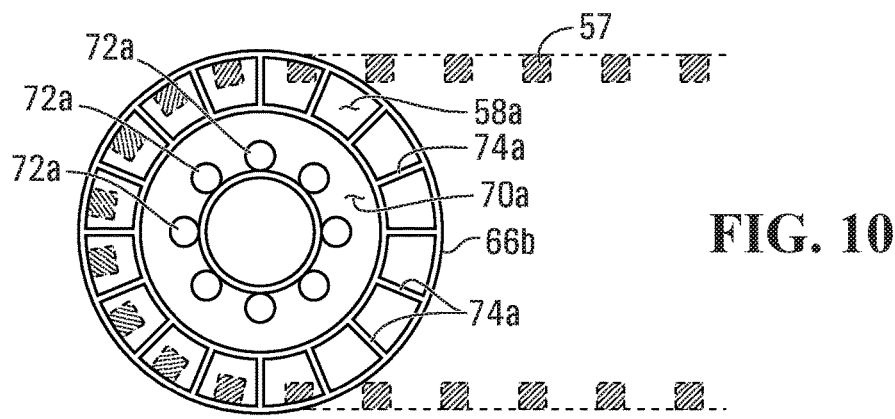
FIG. 10 is a schematical side view of a sprocket configuration according to a variant, and also illustrating in dotted lines the rubber track mounted on the sprocket.
Figure 11:
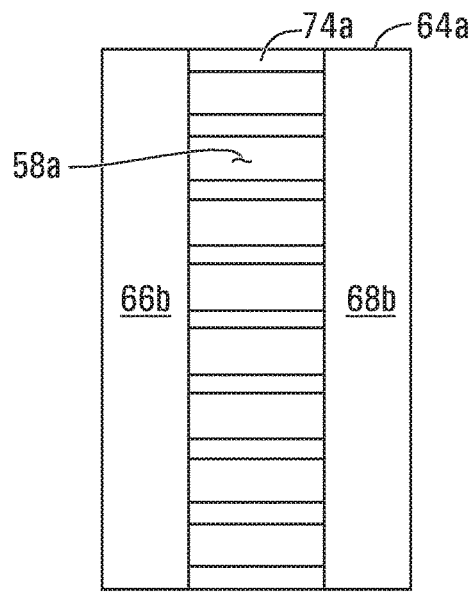
FIG. 11 is an enlarged side view of the sprocket arrangement illustrated in FIG. 10.

With a view to alleviating this difficulty, FIGS. 10 and 11 illustrate in greater detail the structure of a sprocket 64a in accordance with a specific non-limiting embodiment of the present invention, in which removal of a worn out track is facilitated. The sprocket 64a is a variant of the sprocket 64, and is provided with a central hub 70a that mounts to the axle of the vehicle via bolts 72a. A series of radially extending spokes 74a project from the hub 70a. The spacing between the spokes 74a is selected such as to match the pitch of the drive lugs 57 since the spokes 74a define between them sockets 58a which receive the drive lugs 57. On the outer periphery of the spokes 74a are mounted a pair of spaced apart discs 66b, 68b (also referred to as side rings).

In this example of implementation, the structure of the sprocket 64a is such that the sockets 58a receiving the drive lugs 57 can be opened to allow the drive lugs 57 to exit and enter the respective sockets along a direction of movement that is generally parallel to the rotation axis of the socket 58a. When the sockets 58a are so opened, the track 16 can be removed by simply pulling it out of the socket 58a (sliding the track along the rotational axis of the socket 58a) and there is no need to completely dismount the socket 58a from the vehicle.

Figure 12:
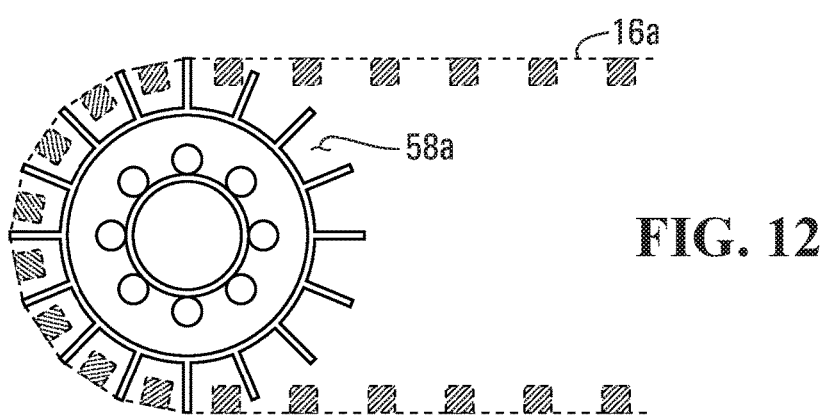
FIG. 12 is a schematical side view of the sprocket configuration illustrated in FIG. 10 in which the sprocket has been opened to afford unobstructed entrance and exit to the drive lugs of the track, in order to allow removal of the track and instillation of a new track without the need to dismount the sprocket from the vehicle.
Figure 13:
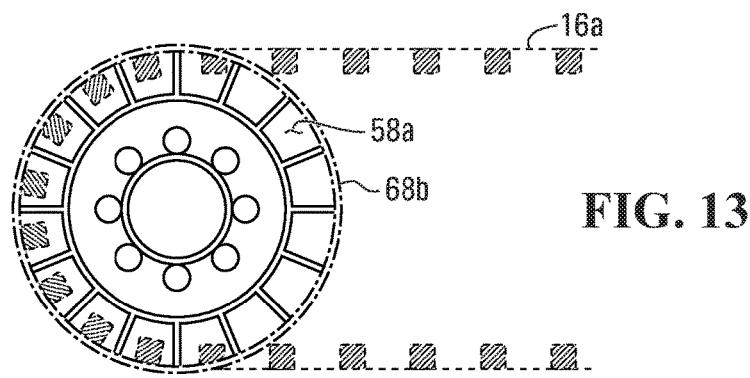
FIG. 13 is a view similar to FIG. 12 but in which one of the side rings of the sprocket still remains on the sprocket.
Figure 14:
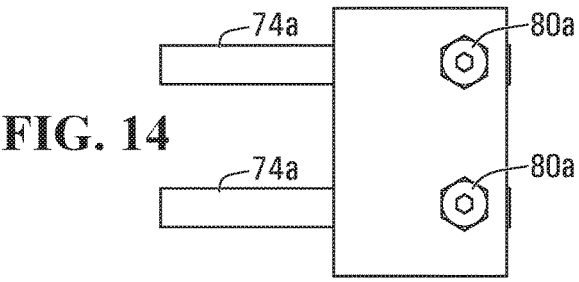
FIG. 14 is a top fragmentary view of the sprocket showing details of the attachment of a side ring to sprocket spokes.

FIG. 12 illustrates the sprocket 64a of FIG. 10 but in which the sockets 58a have been laterally opened thus allowing removal of the track 16. The lateral opening of the sockets 58a is achieved in this example by the removal of the side rings 66b, 68b as it will be discussed later. Note that the removal of both side rings 66b, 68b is not necessary in practice since the sockets 58a need to be opened only on one side (the external side of the vehicle) in order to allow the removal of the track 16. FIG. 13 illustrates this particular arrangement where only the side ring 66b has been removed, the side ring 68b being still mounted on the sprocket 64a and being shown in dotted lines.

Note however, there may be applications in which it may be desirable to allow both side rings 66a, 68a to be removed such as to provide a completely symmetrical sprocket. In this fashion the sprocket 64a can be installed in one of two possible orientations without any impact on its functionality in terms of allowing the removal of the track 16. This is useful in instances where some wear may occur and flipping the sprocket 64a over allows evening out of the sprocket wear.

Figure 16:
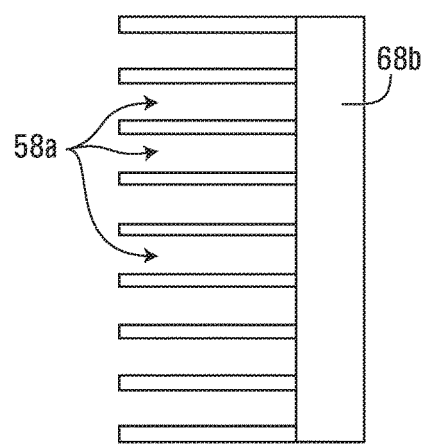
FIG. 16 is a top view of the entire sprocket with one of the side rings removed.

FIG. 16 is a top view of the sprocket 64a shown in FIG. 13, illustrating the sockets 58a laterally opened on the left side with the side ring 68b remaining in place.

Figure 15:
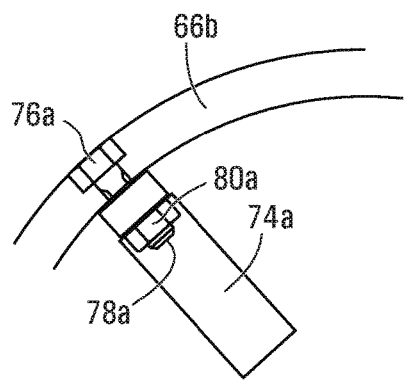
FIG. 15 is side view of the structure shown in FIG. 14.
Figure 17:
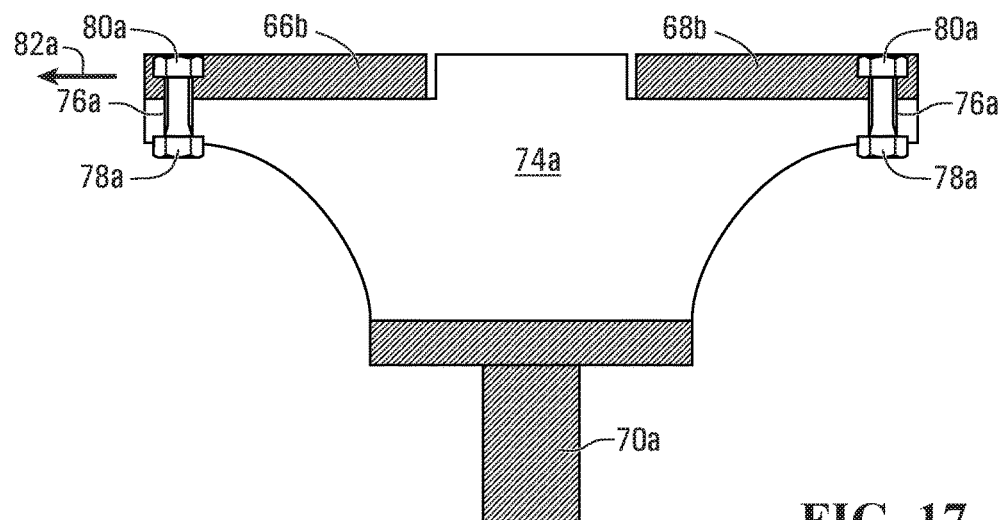
FIG. 17 is a fragmentary vertical cross-sectional view of the sprocket illustrating details of the attachment between the side rings and the spokes of the sprocket.

The mounting system which allows the selective removal of the side rings 66b, 68b is illustrated in greater detail in FIGS. 14 to 19. The mounting system uses fasteners coupling the side rings 66b, 68b to the spokes 74a. When the fasteners are removed, the outer rings 66a, 68a laterally slide out of the sprocket 64a, thus laterally opening the sockets 58a. Each side ring 66b, 68b is made of metallic material and it is dimensioned to have an internal diameter that is slightly larger than the external diameter of the spokes 74a. In this fashion, as best shown in FIGS. 15 and 17 the outer rings 66b, 68b sit on top of the spokes 74a. Fasteners 76a connect the side ring 66b, 68b to each spoke 74a. The fasteners 76a include a bolt 78a engaging a nut 80a which sits in a countersunk hole made on the outer surface of the side ring 66b, 68a. In this fashion, the nuts 80a are flush with the outer surface of the side rings 66b, 68b and do not protrude therefrom. The number of bolts used to retain the side rings 66b, 68b to each spoke 74a can vary. In the illustrations, a single fastener 76a is being shown per spoke 74a, however more than one can be used if desired. Alternatively, some spokes 74a may not receive any fastener.

In order to remove the side rings 66b, 68b the fasteners are loosened with the appropriate tool. The bolts 78a are removed completely by sliding them out of their holes. This is possible since the removal operation takes place on the side of the sprocket 64a that is laterally exposed and easily accessible. Generally the location of the fasteners that hold the side rings 66b, 68b is within the area that is defined by the circular periphery of the sprocket 64a; this area is laterally accessible to allow removal of the fasteners as access to this area is not impeded by the track 16.

After the bolts 78a are removed, the nuts 80a remain in their respective countersunk holes and are removed with the side ring 66b, 68b. When each bolt 78a has been removed, the side ring 66b, 68b simply slides out of the sprocket 64a along the direction shown by the arrow 82a. Note that before this operation can be effected, it would be preferable to release the tension in the track 16 by bleeding down the hydraulic pressure in the tensioning system 44. Since there may still be some degree of residual tension in the track 16, a pry bar or any other suitable tool can be used to forcibly pull out the side ring 66b, 68b against the friction generated by the internal surface of the track 16.

Figure 18:
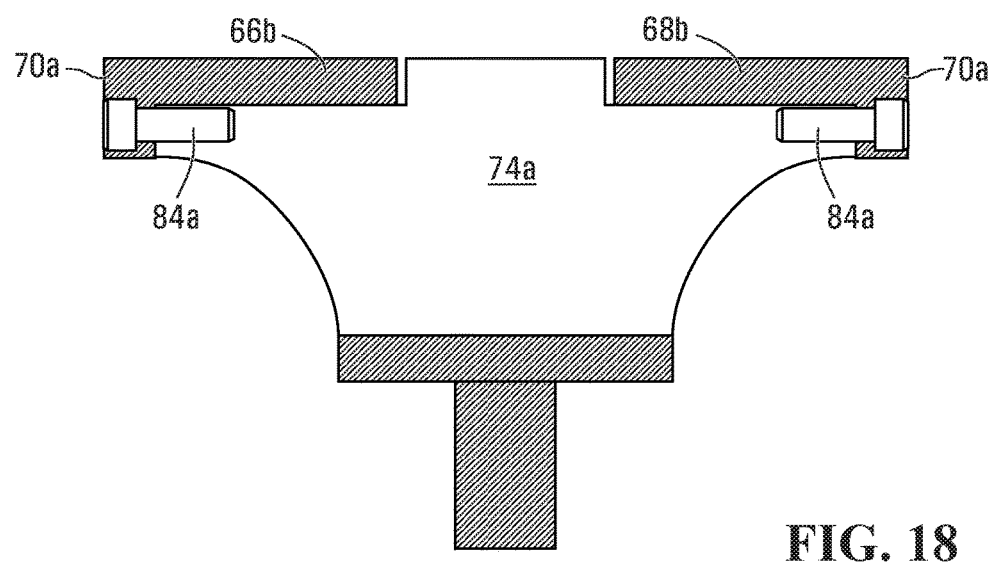
FIG. 18 is a fragmentary vertical cross-sectional view of the sprocket illustrating details of the attachment between the side rings and the spokes of the sprocket, according to a variant.

FIG. 18 illustrates an alternative arrangement where the side rings 66b, 68b have a peripheral flange 70a that abuts on the lateral edges of the spokes 74a. Bolts 84a secure the flange to the spokes 74a. In this instance, the bolts 84a are also easily removable while the track 16 is still engaged on the sprocket 64a since access to the bolts 84a with a tool is possible from the lateral side of the sprocket 64a. After all the bolts 84a have been removed the side ring 66b, 68b is removed thus allowing the track 16 to slide out of the sprocket 64a.

Figure 19:
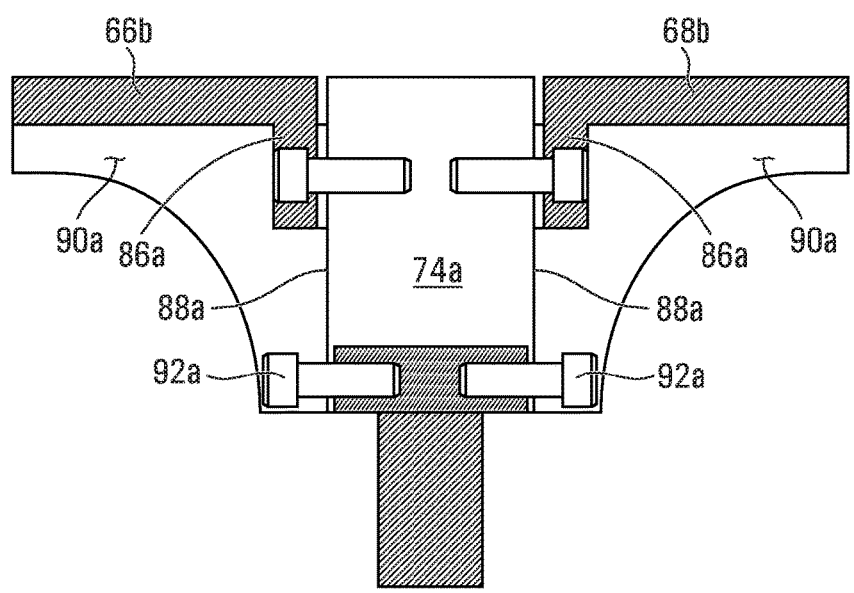
FIG. 19 is a fragmentary vertical cross-sectional view of the sprocket illustrating details of the attachment between the side rings and the spokes of the sprocket, according to yet another variant.

FIG. 19 is yet another possible variant of the sprocket 64a where the side ring 66b, 68b has a flange 86a that is positioned internally and which is used to fasten the side ring 66b, 68b to the spokes 74a. Note in this instance, the spokes 74a are narrower and have lateral faces 88a to allow the flanges 86a to abut with them in a face-to-face relationship. To provide sufficient radial support to the side rings 66b, 68b the rings are provided with stiffening webs 90a. The stiffening webs extend radially with respect to the side-rings 66b, 68b and they abut the lateral faces 88a. Additional fasteners are provided at 92a to secure the webs 90a to the spokes 74a.

Figure 17A:
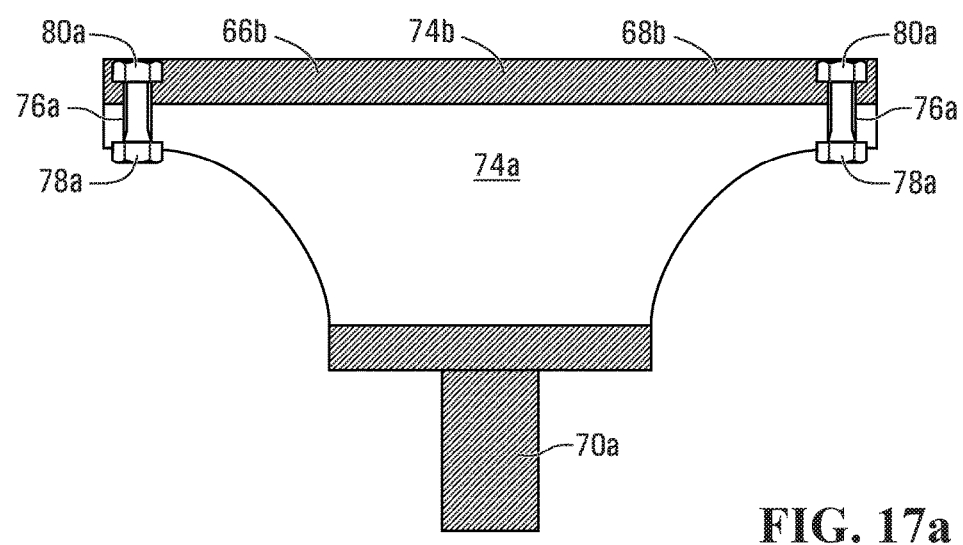
FIG. 17*a* is a view similar to FIG. 17 but of a variant.
Figure 17B:
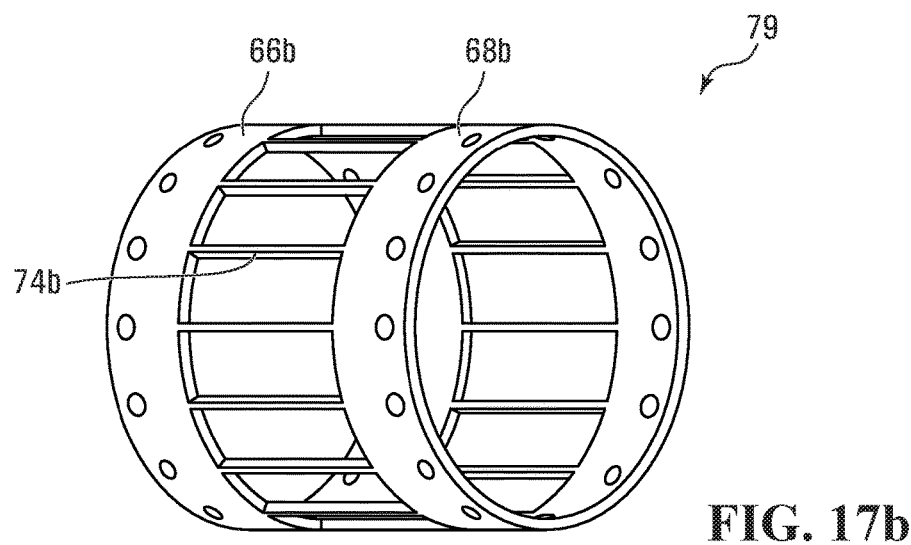
FIG. 17*b* is a perspective view of the variant shown in FIG. 17*a*.

In a yet another possible variant, the rings 66b and 68b can be integrally formed with drive pins 74b such that these three components can be removed or installed on the sprocket core as a single unit. This arrangement is illustrated at FIGS. 17a and 17b. The outer rings 66a, 66b and the drive pins 74b thus form an integral outer ring 79 sitting atop the spokes 74a. The arrangement is such that the drive pins 74b register with the respective spokes 74a but in a variant this registration may only be partial (only some of the drive pins 74b register with spokes 74a) or simply nonexistent (none of the drive pins 74b register with the spokes 74a). The advantage of this arrangement is to allow complete removal of the component of the sprocket that is in contact with the track. Thus in addition to facilitating the removal and installation of the track on the vehicle, the outer ring 79 can be easily replaced when some of its components are worn out. For instance, if the drive pins 74b wear out as a result of vehicle operations in conditions in which abrasive material gets lodged between the track and the sprocket, such as sand or gravel, it makes it possible to quickly replace the outer ring 79 with a new unit having drive pins 74b with nominal dimensions.

The outer ring 79 is attached to the sprocket core as per the method described in connection with FIG. 17, using bolts 78a that fasten the outer ring 79 to the respective spokes 74a.

Figure 20:
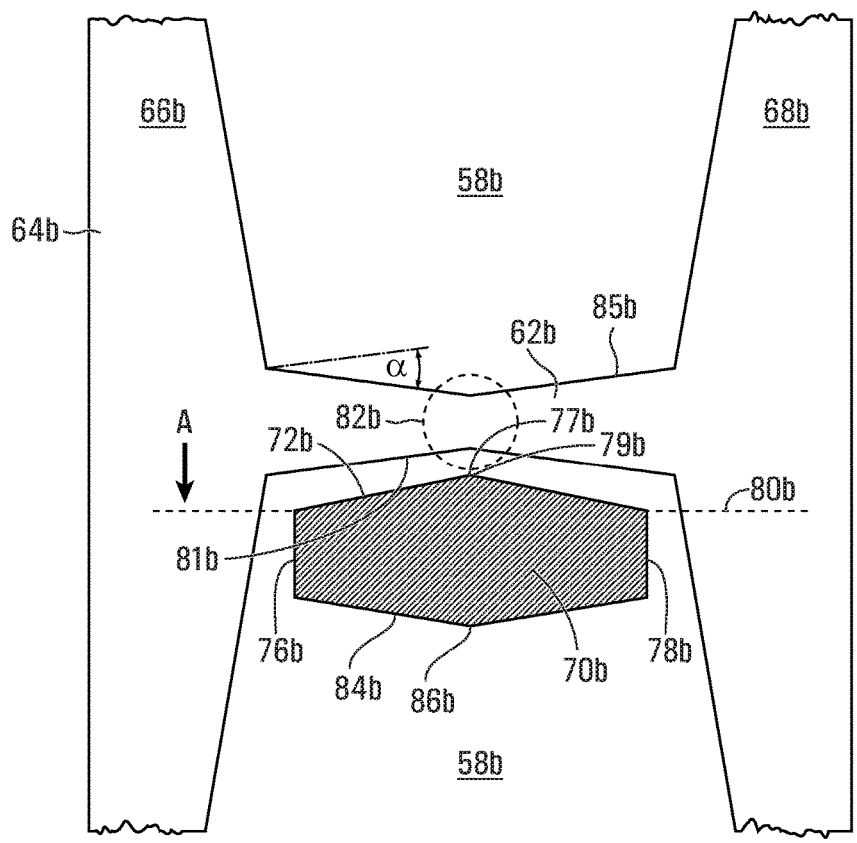
FIG. 20 is a top, enlarged, fragmentary view of a sprocket according to a variant, illustrating the shape of the drive lug receiving sockets and also illustrating in cross-section a drive lug according to a non-limiting example of implementation of the invention.

In accordance with another specific non-limiting embodiment, now described with reference to FIG. 20, there is provided a sprocket 64b, which is a variant of the sprocket 64. The sprocket 64b may be made as a casting. This is done for cost reasons. However, the casting operation imposes a certain number of design constraints on the sprocket. One of those constraints is the geometric shape of the drive pins or bars 62b that require a so called "draft angle" in order to be able to carry out the moulding operation. The draft angle is best shown at FIG. 20. Instead of being straight and of a constant cross-sectional shape, the drive pin or bar 62b is narrowed at the center in order to create an angle alpha ($\alpha$) which is of sufficient magnitude to allow the removal of the sand. Typically, this angle $\alpha$ is in the range of about 1 degree to about 25 degrees. The drive pin or bar 62b thus has a recessed portion 81b. A drive pin or bar 62b with such a cross-sectional shape creates a particular stress pattern on the drive lugs 57 that are normally made with flat faces. As a result, the drive pin or bar 62b concentrates the pressure on the drive lug face near the side edges of the drive lug 57 with is detrimental to drive lug and can accelerate the drive lug 57 wear. To overcome this problem embodiments of the present invention provide an improved drive lug 70b that has a cross-sectional shape which follows to at least some extent the shape of the drive pin or bar 62b in order to allow a more even pressure distribution over the face of the drive lug 70b. FIG. 20 shows the drive lug 70b with relation to the drive pin or bar 62b, notably in a socket 58b of a plurality of sockets 58b of the sprocket 64b. For clarity, the sprocket 64b in use turns along the direction A and therefore the drive pin or bar 62b engages the driving face 72b of the drive lug 70b to drive the track 16*b*. The drive lug 70*b* has a cross-sectional profile such that the thickness of the drive lug 70*b* (the thickness is the dimension of the drive lug 70*b* measured along the direction of rotation A or the direction along which the track 16*b* is driven) manifests an enlargement 77*b* located at a point intermediate the lateral extremities 76*b*, 78*b* of the drive lug 70*b*. In a specific example of implementation the enlargement 77*b* is at midpoint between the lateral extremities 76*b*, 78*b*. The enlargement 77*b* forms a projection or projecting portion of the driving face 72*b*. In this embodiment, the driving face 72*b* of the drive lug 70*b* is nonparallel to the widthwise direction of the track 16 over at least a majority (i.e., a majority or substantially an entirety) of an extent of the drive lug 70*b* in the widthwise direction of the track 16. In this example, the driving face 72*b* of the drive lug 70*b* is nonparallel to the widthwise direction of the track 16 over substantially the entirety of the extent of the drive lug 70*b* in the widthwise direction of the track 16.

The enlargement 77*b* is a straight line rib 79*b* that runs from a major portion of the distance between the tip 67 of the drive lug 70*b* and the base 69 of the drive lug. In a specific example of implementation, the rib runs for the entire distance from the tip to the base. The drive face of the lug 70*b* defines a pair of flat surfaces that meet at an angle defining the rib between them.

The profile of the drive lug 70*b* is made to match the profile of the drive pin or bar 62*b* such that when the drive pin or bar 62*b* engages the drive lug face 72*b* the pressure distribution over the drive lug face 72*b* will be more even, by comparison to the prior art arrangement where the pressure is concentrated near the lateral edges 76*b*, 78*b*. The degree to which the enlargement projects from the imaginary plane 80*b* depends to a large extent on the draft angle a; the larger the angle the larger the enlargement will extend. Also note that if the profile of the drive pin or bar 62*b* is different from what is shown in the drawings, for instance the profile is such that the narrowed area 82*b* is not in the center of the drive pin or bar 62*b*, rather it is offset to one side or to the other side, the lateral location of the enlargement could also be shifted such that it matches the location of the area 82*b*. In this fashion, the drive pin or bar 62*b* has a shape that is complementary to the drive lug drive face 72*b* in order to achieve a more uniform pressure distribution over the drive lug 70*b*.

Note that the face 84*b* of the drive lug 70*b* which is opposite the face 72*b* is also provided with an enlarged portion 86*b* such that it is symmetrical to the face 84*b*. The enlarged portion 86*b* forms a projection or projecting portion of the driving face 84*b*. The opposite side of the drive pin or bar 62*b* has a recessed portion 85*b*. In this fashion, when the track is run in reverse, in which case the face 84*b* is the face which receives the driving force from the sprocket 64*b*, the pressure loading on the face 84*b* is also more evenly distributed.

In some cases, the pin or bar 62*b* may have a curved shape, in which case the drive lug face 72*b* can be imparted a matching curved shape to achieve more balanced pressure distribution.

Figure 20A:
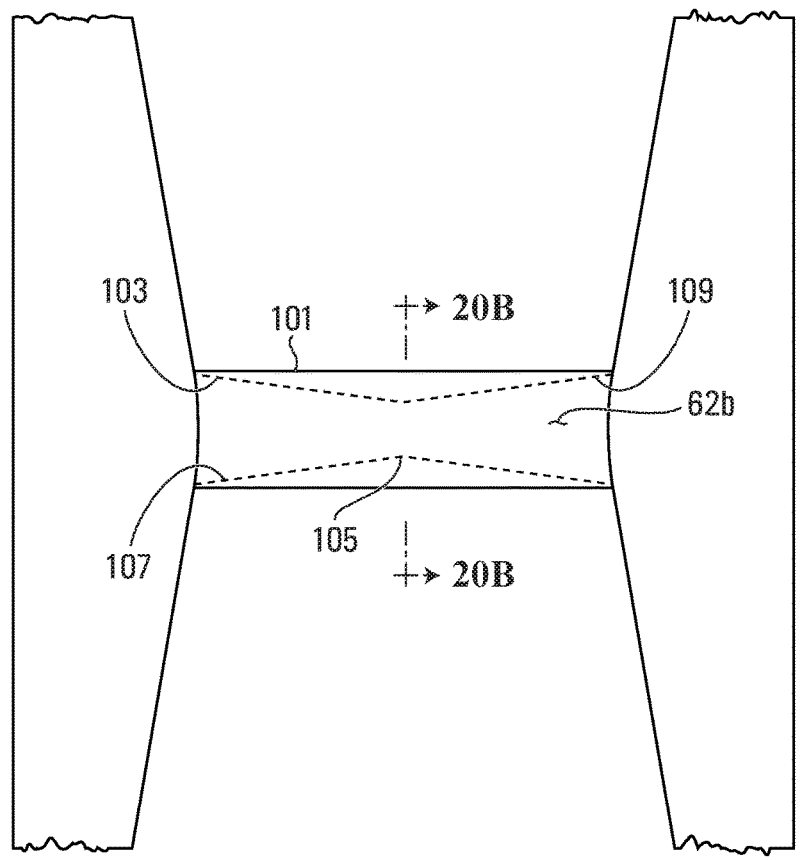
FIGS. 20*a* and 20*b* illustrate a sleeve and pin combination.
Figure 20B:
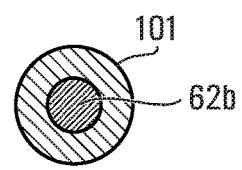

In other cases, the drive lug face 72*b* may be flat, despite the pins 62*b* being non-flat (e.g., narrowed at the center). Under these circumstances, relatively even pressure distribution between a lug 70*b* and a pin 62*b* can be achieved by providing a sleeve 101 that fits over the pin 62*b*. This embodiment is shown in FIGS. 20*a* and 20*b*. The sleeve 101 may have an exterior surface that is of generally constant cross-sectional dimension along its length such that, when the sleeve is fitted over the drive pin 62*b*, the exterior surface will engage the lug face 72*b* along its entire length and thus evenly distribute the pressure over the lug face 72*b*.

The sleeve 101 has an outer generally cylindrical shape. Note that other shapes are also possible without departing from the spirit of the invention. Internally, the sleeve defines a cavity 103 which is complementary to the shape of the drive pin or bar 62*b*. In this fashion, the drive pin or bar 62*b* can snugly fit inside the cavity 103. The cavity 103 thus has the reverse shape of the drive pin or bar 62*b*. In the example shown in the drawings, the cavity 103 has at its center a narrowed section 105 corresponding to the midpoint constriction of the drive pin or bar 62*b*. On both sides of the narrowed section 105 are formed enlargements 107 and 109. In this fashion, the wall thickness of the sleeve 101, which is the thickness of the wall between the internal cavity 103 and the outer lug contacting surface varies along the length of the sleeve 101. The wall is thickest at a location that is between the extremities of the sleeve 101, and preferably but not necessarily is at mid-point of the sleeve. The wall thickness progressively diminishes from the thickest point toward each sleeve 101 extremity.

The sleeve 101 may be made of synthetic material such a polyurethane or any other suitable plastic material that has adequate durability characteristics. Alternatively, the sleeve 101 can be made of metallic material. The sleeve 101 can be formed on the drive pin or bar 62*b* by overmolding. This operation involves placing the drive pin or bar 62*b* in a mold and injecting in the mold the material forming the sleeve 101. In this fashion the material takes the shape of the drive pin or bar 62*b* and solidifies around it. This would produce a continuous sleeve 101 around the drive pin or bar 62*b*. This embodiment is shown in FIG. 20*b*. Note that for practical reasons, such overmolding operation would be performed simultaneously over each drive pin or bar 62*b* of the sprocket. The mold is thus designed to receive the sprocket in its entirety and has internal partitions that define cylindrical void volumes around each drive pin or bar 62*b*.

Alternatively, the sleeve 101 can be manufactured as a multi-component device that is mechanically mounted or adhesively connected to the drive pin or bar 62*b*. More specifically, the sleeve 101 can be cast or otherwise manufactured as two halves that mate and encase the drive pin or bar 62*b*. Fasteners such as screws can be used to attach the two halves together.

Figure 22:
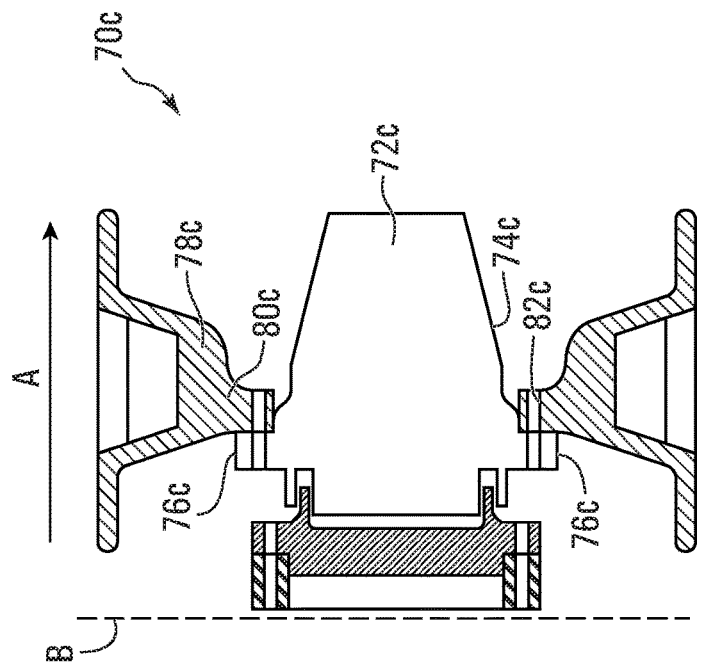
FIG. 22 is a cross-sectional view of a prior art sprocket arrangement.
Figure 21:
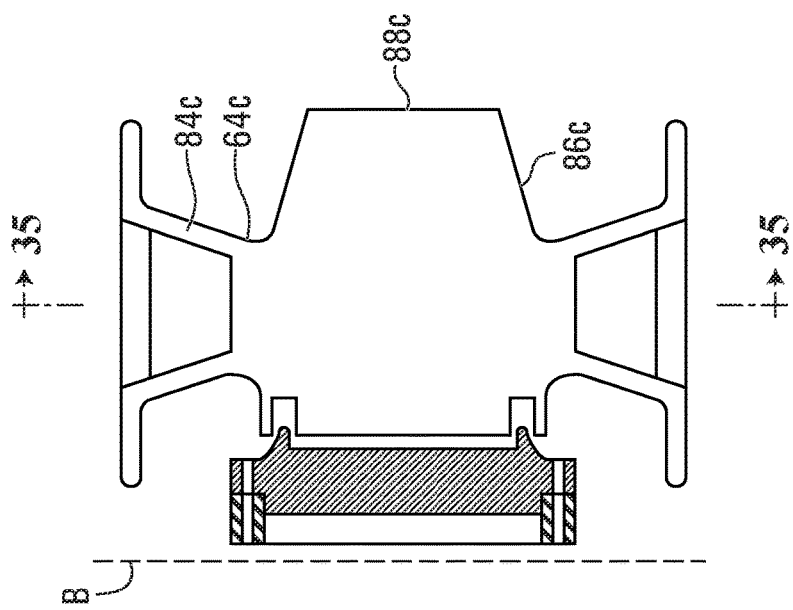
FIG. 21 is a cross-sectional view of a sprocket according to yet another variant.

In accordance with yet another specific non-limiting embodiment of the present invention, FIG. 21 illustrates the structure of a sprocket 64*c*, which is yet another variant of the sprocket 64. FIG. 22 shows a similar view but of a prior art design. The prior art design is identified by the reference numeral 70*c*. The sprocket 70*c* is a multi component device which includes a hub 72*c* that contains drive gears which are part of the power transmission system. In particular, the hub 72*c* includes a planetary gearing system that includes one or more outer (or planetary) gears which revolve around the axis of rotation of the sprocket 70*c*, and also include one or more internal sun gears that mesh with the planetary gear. In use, power is supplied to the sun gear(s) which in turn drive the planetary gear resulting into rotational motion being imparted to the sprocket 70*c*. The hub 72*c* has an outer housing 74*c* on which is provided a flange 76*c*. The outer sprocket structure 78*c* that engages the track is bolted to the flange 76*c*. The outer sprocket structure 78*c* or rim is provided with an internal inwardly projecting flange 80*c* that abuts in a face to face relationship with the flange 76*c*. Both flanges 76*c* and 80*c* are secured to one another via suitable fasteners, such as bolt inserted through registering bolt holes 82c. This prior art design is objectionable because it is bulky; the flange to flange attachment is such that the outer sprocket structure 78c projects outwardly (along the direction A) by a distance that is at least equal to the thickness of the flange 76c. This implies that for installations where it is desirable to recess the outer sprocket structure 78c as much as possible, the options are limited because of the requirement to provide a mounting flange 76c to which the outer sprocket structure 78c is to attach.

The example of implementation of the invention shown in FIG. 21 overcomes this problem by forming the sprocket rim 84c integrally with the hub 86c. In this instance, the hub 86c has a casing 88c to which is mounted the planetary gear and that meshes with the one or more sun gears. Since there is no longer a requirement for a mounting flange, the outer sprocket structure 84c can now be mounted closer to the imaginary reference plane B by comparison to the prior art arrangement shown in FIG. 22. In addition, the connection between the rim 84c can be made sturdier by using more material which makes the entire sprocket more resistant and also reduces flexion between the hub 86c and the rim 84c.

Figure 35:
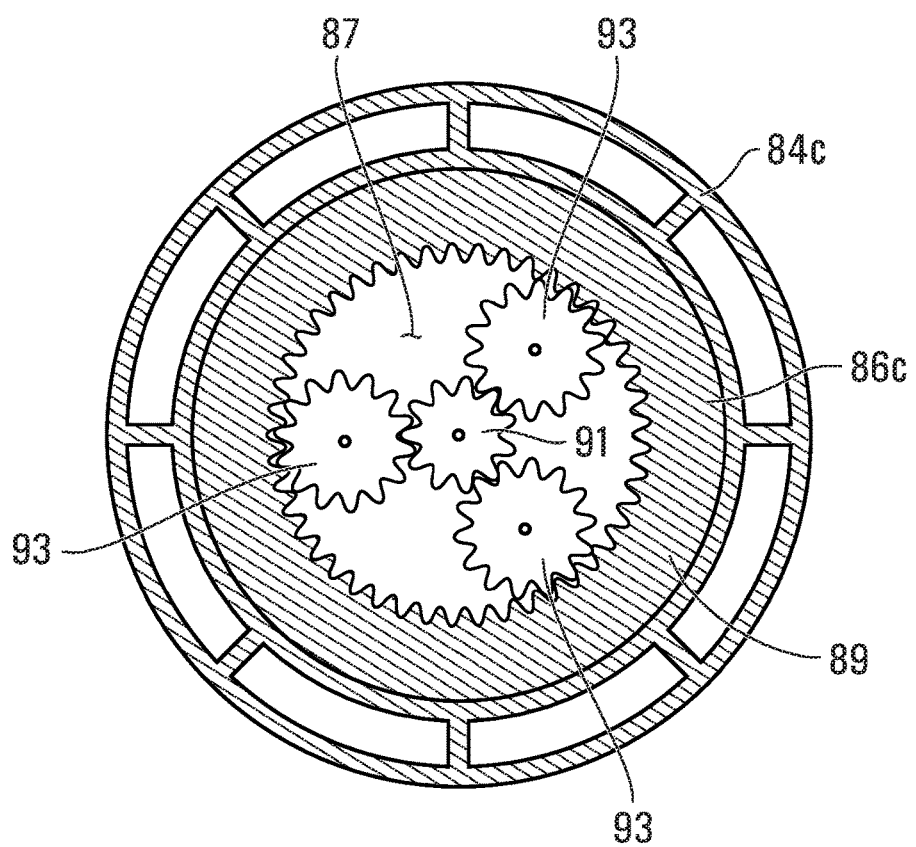
FIG. 35 is a cross-sectional view taken along lines 35-35 in FIG. 21.

FIG. 35 is a cross sectional view that illustrates the internal construction of the sprocket 64c. The hub 86c which is integrally formed with the rim 84c defines an internal cavity 87 in which is mounted the planetary gear system. The planetary gear system includes a ring gear that is integrally formed with the casing 86c. A sun gear 91 which is connected to the drive axle of the vehicle drives the ring gear 89 via a set of gears 93.

Figure 23:
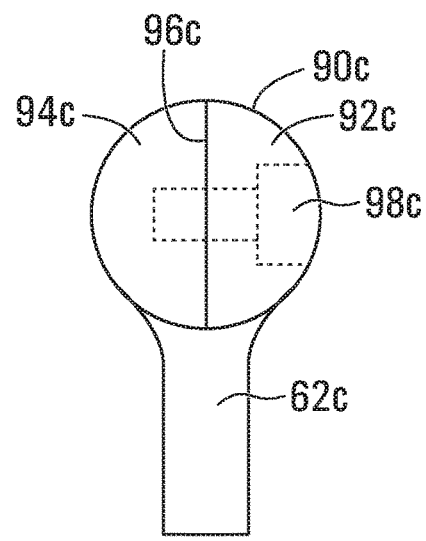
FIG. 23 is an enlarged cross-sectional view of a drive bar of the sprocket according to the invention, which uses a sacrificial wear jacket.

In a different example of implementation illustrated in FIG. 23, the drive pin 62c of the sprocket 64c is provided with a wear jacket 90c which is designed to protect the pin 62c against wear. The wear jacket 90c is a two piece device, including first piece 92c and a second piece 94c that meet along a parting plane 96c to fully enclose the pin 62c. When the first and second pieces 92c, 94c are mated to one another, they form between them a cavity that is complementary to the shape of the pin 62c. In this fashion both first and second pieces 92c, 94c can be mounted to the pin 62c and form around the pin 62c a protective jacket which prevents the rubber material of the track 16c to be in contact directly with the pin 62c. While the wear jacket 90c is susceptible to wear out over time, it is intended to be a replaceable item.

The first and second pieces 92c, 94c connect with one anther by bolts 98c.

Figure 24:
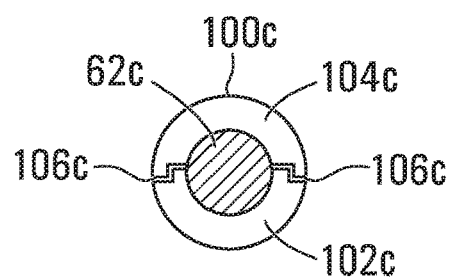
FIG. 24 is a variant of the wear jacket shown in FIG. 23.

A possible variant is shown in FIG. 24. The wear jacket 100c includes a first half 102c and a second half 104c that are connected to one another via mechanical arrangement 106c which can be a clip or may also use fasteners. The resulting wear jacket 100c is free to rotate around the pin 62c and thus forms a bushing which allows reducing the frictional contact between the sprocket 64c and the track 16c.

After the wear jacket 100c is worn out, it is replaced by removing the used wear jacket 100c and installing a new one. The installation is done by placing each half 102c, 104c of the wear jacket on the pin 62c and attaching the halves 102c, 104c to the pin 62c.

The wear jacket can be made of a suitable synthetic material providing a low friction surface or may also be made of a metallic material.

Note that for the embodiments shown in FIGS. 23 and 24 the wear jacket does not need to slip on the pin 62c, which would require access to one of the extremities of the pin 62c. Rather, the halves of the wear jacket are mated to one another along a direction that is generally transverse to the pin 62c axis. This makes the installation easier.

Figure 25:
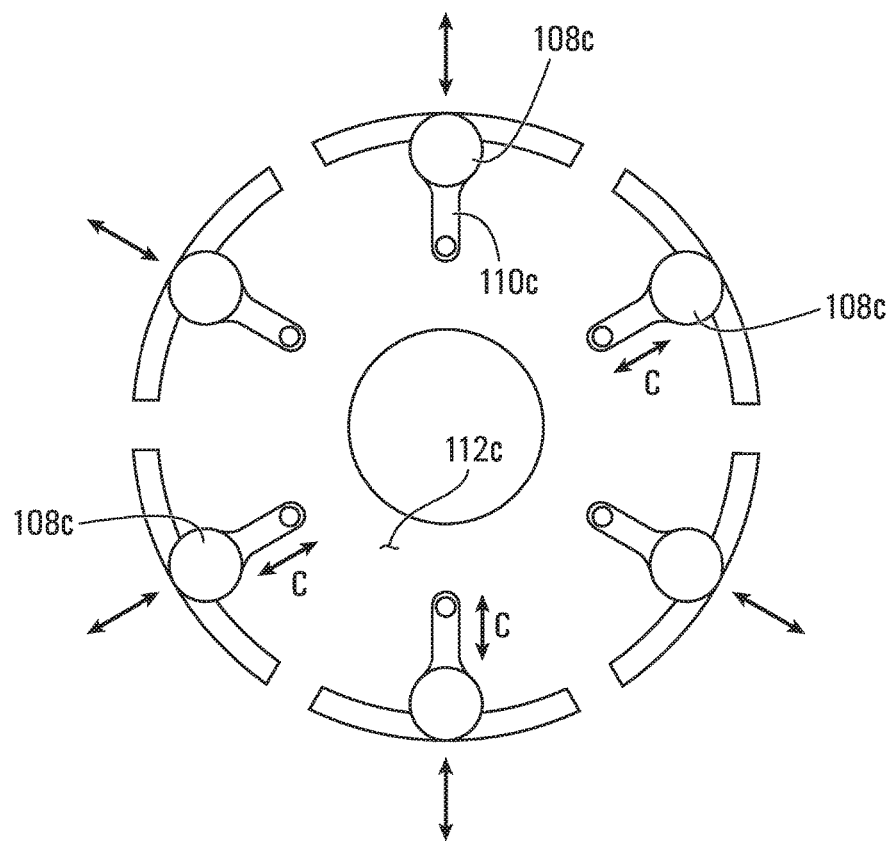
FIG. 25 is a cross-sectional view through a sprocket generally of the type shown in FIG. 3, illustrating yet another form of construction using radially adjustable drive pins.

FIG. 25 is yet another possible variant which uses drive pins whose radial position can be adjusted to compensate for wear (which has a tendency to reduce the diameter of the sprocket). The sprocket arrangement has a series of radially adjustable drive pins 108c. The extremities of the drive pins 108c are mounted in respective grooves 110c in end plates 112c which extend transversally to the rotation axis of the sprocket. In this fashion, the drive pins 108c are free to move radially in their respective grooves in the direction shown by C.

Figure 26:
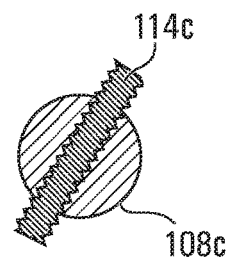
FIG. 26 is an enlarged cross-sectional view of a drive pin of the sprocket shown in FIG. 25.

A suitable locking system is provided in order to move the drive pins in the desired position and lock the drive pins in that position. Various types of the locking systems can be used. One example, shown in FIG. 26 is a rod 114c which threadedly engages the drive pin 108c and which can be rotated by any suitable means, such as an electric motor, in order to displace the drive pin 108c radially in the groove 110c. The movement of the drive pins 108c can be synchronized such that all the pins 108c move in unison. This can be accomplished in many different ways, one being the provision of a mechanical drive system that rotates all the rods 114c at the same time and by the same degree.

Figure 28:
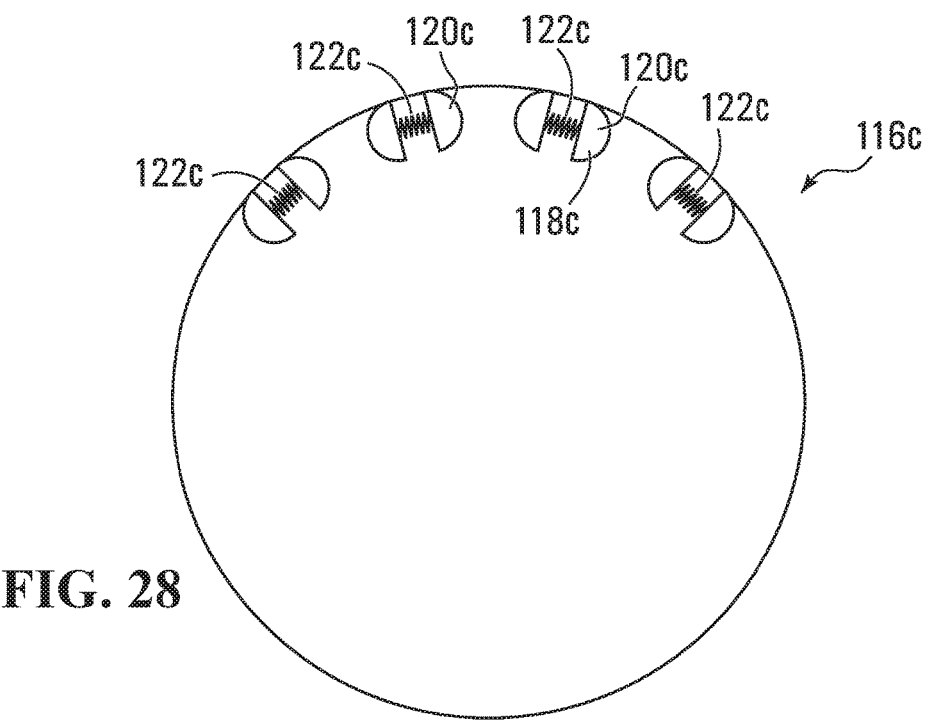
FIG. 28 is a cross-sectional view of the sprocket according to yet another variant of FIG. 25.

FIG. 28 shows yet another possible refinement in which the sprocket 116c is provided with resilient drive pins 118c. The drive pins 118c have a component 120c that is mounted via a resilient element 122c to another component 124c which can be part of the drive pin 62c or can rest against another part of the sprocket. In this fashion the floating component 120c can resiliently yield when it is engaged by a drive lug 57 of the track 16c.

The resilient element 122c can be a spring or a block of resilient material such as rubber.

Figure 27:
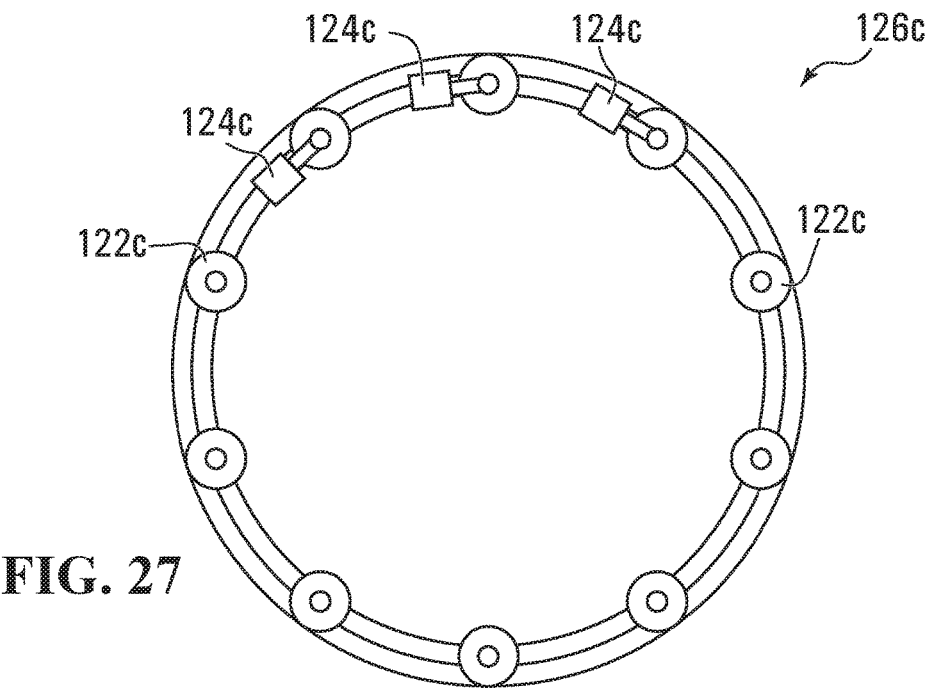
FIG. 27 is a cross-sectional view of the sprocket according to a variant of FIG. 25.

FIG. 27 is yet another possible variant in which the pitch of the sprocket can be varied. In this arrangement the extremities of the drive pins 118c are mounted in a peripheral channel 124c formed on end plates 126c (a single end plate is shown in the drawings). In this fashion, the drive pins 118c are circumferentially movable independently from one another thus allowing varying the spacing between them, hence the pitch of the sprocket. The means for moving the drive pins 118c may include actuators 124c that may be hydraulic, pneumatic or electric. In a specific example of implementation, the actuators 124c are synchronized such that the change of pitch of the sprocket is uniform. The synchronization is done via a control system that triggers the extension or the retraction of the actuators by a controlled amount in order to achieve the desired degree of displacement, hence pitch change.

Figure 29:
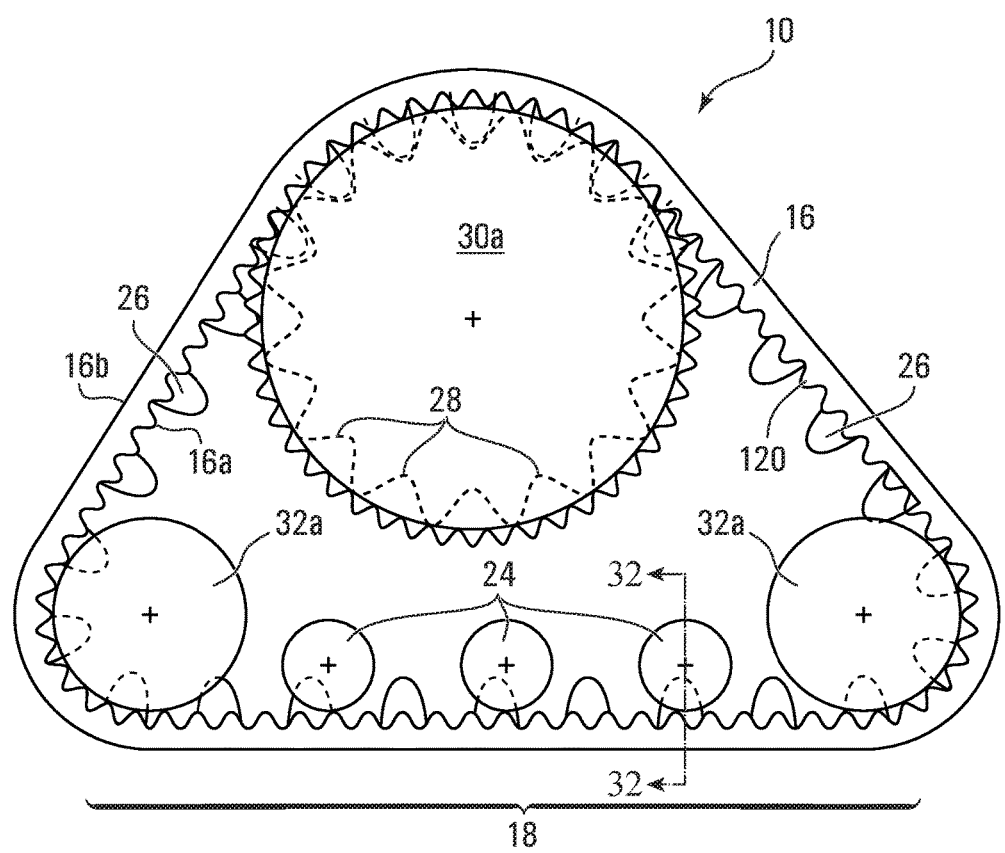
FIG. 29 is a side elevational view of an undercarriage for an agricultural or construction vehicle which uses a rubber track with a dual drive lug pattern.

In yet another specific non-limiting embodiment, now described with reference to FIG. 29, the track 16 has an outer ground engaging surface 16b and an opposite inner surface 16a. the track 16 is supported by a series of wheels that define a generally triangular track motion path. That path has a lower run 18 which is a ground engaging run. When the vehicle is being driven it is supported on the ground engaging run 18.

In this specific non-limiting embodiment, the series of wheels that support the track 16 include a drive wheel 30a which is mounted on top, two generally opposite idler wheels 32a and a series of mid-rollers 24 mounted between the idler wheels 32a. The mid-rollers 24 engage the inner surface of the ground engaging run to maintain the ground engaging run 18 in contact with the ground during the operation of the vehicle. The mid-rollers 24 are mounted on a suspension system (not shown) allowing the mid-rollers 24 to yield upwardly when the vehicle rides over obstacles.

Figure 30:
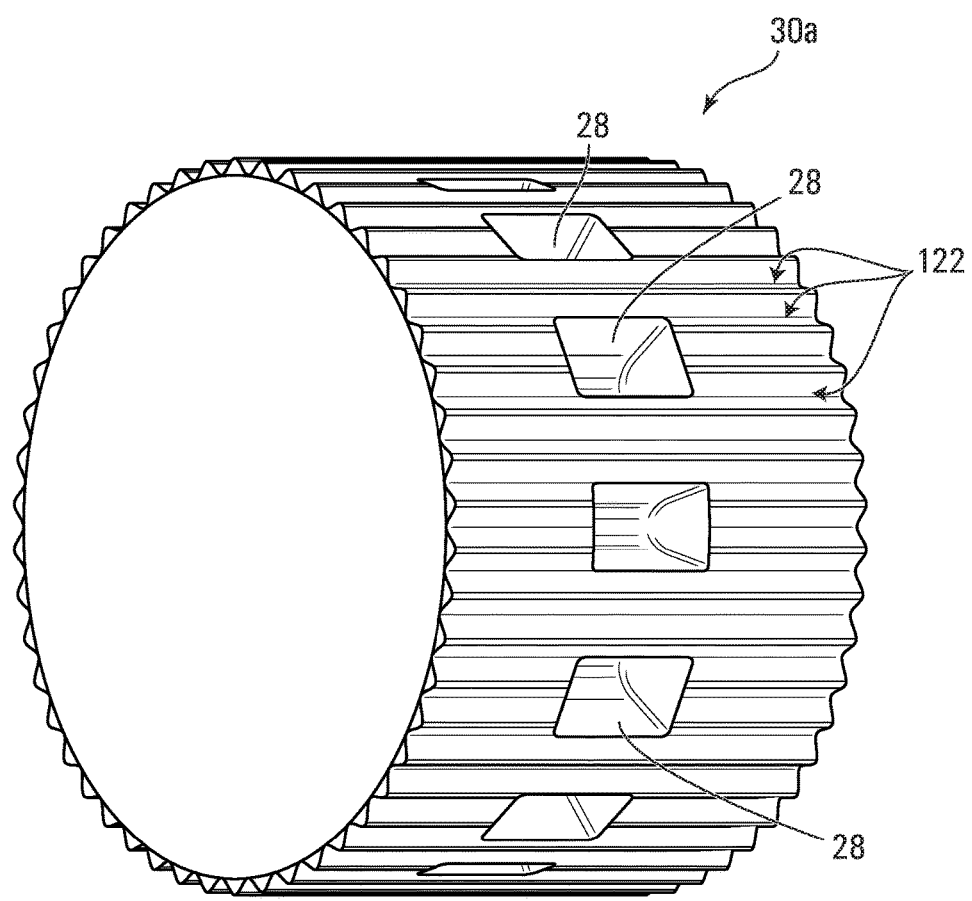
FIG. 30 is perspective view of a sprocket that drives the track of the undercarriage shown in FIG. 29.
Figure 31:
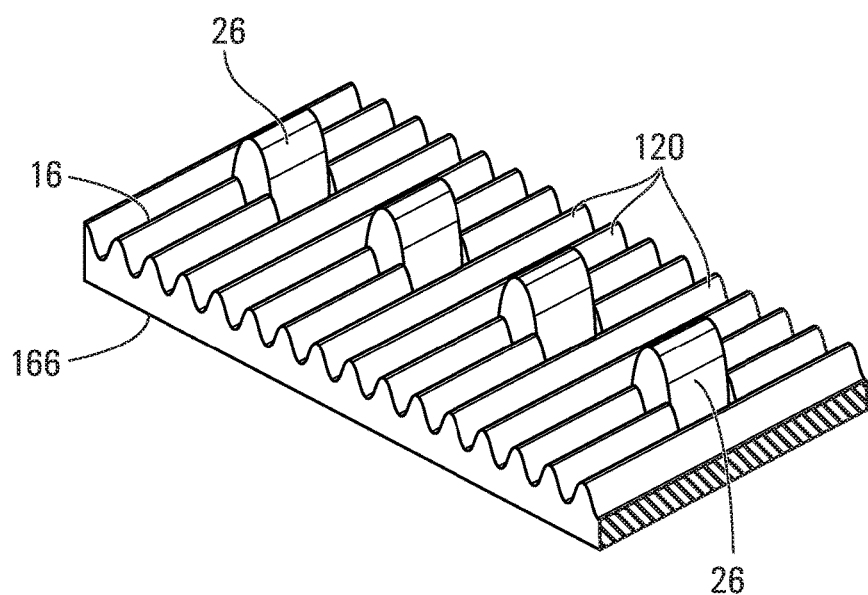
FIG. 31 a fragmentary perspective view of the track of the undercarriage of FIG. 29, illustrating in greater detail the dual drive lug pattern.

FIGS. 30 and 31 illustrate in greater detail the mechanical relationship between the track 16 and the drive wheel 30a. In this example of implementation, the drive wheel 30a works as a sprocket and engages drive lugs 26 projecting from the inner surface 16a of the track 16. The drive lugs 26 are made from rubber material and are located at equally spaced intervals from one another. The drive lugs 26 fit into respective sockets 28 formed around the periphery of the sprocket 30a. The dimensions of the sockets 28 and their spacing matches those of the drive lugs 26, such that as the sprocket 30a turns the drive lugs 26 mesh with the respective sockets 28.

In this example of implementation, the drive lugs 26 are centrally located on the track 16. In a possible variant, the drive lugs could be offset laterally, toward one side edge of the track 16.

The drive lugs 26 and the corresponding set of sockets 28 constitute a first positive drive connection between the sprocket 30a and the track 16. The undercarriage 10 includes an additional drive connection that is also gear-like, including projections on the track 16 that mesh with complementary recesses on the sprocket 30a. This additional drive connection spreads around the loading applied on the track to drive it, which otherwise would be concentrated at any given moment on the few drive lugs 26 engaging the sprocket 30a.

The additional drive connection is spread over a larger surface area of both the sprocket peripheral surface and the track inner surface 16a. More specifically, the additional drive connection includes a series of teeth 120 which engage complementary recesses 122 on the sprocket 30a.

The teeth 120 are smaller in height than the drive lugs 26. In a specific and non-limiting example of implementation, a ratio between the height of a drive lug 26 and a tooth 120 is in the range from about 0.05 to about 0.25, preferably in the range of about 0.12 to about 0.2 and most preferably of about 0.1 to about 0.166.

In a specific example, the teeth 120 are a multiple of the main drive lug 26. For instance there could be 6 teeth 120 per main drive lug 26 or less.

Also, the pitch of the two positive drive systems are different. The ratio between the pitch of the drive lugs 26 and the pitch of the teeth 120 is in the range from about 0.05 to about 0.25, preferably in the range of about 0.12 to about 0.2 and most preferably of about 0.1 to about 0.166.

A ratio between the length (the length is the dimension measured along a direction that is transverse to the track 16) of a drive lug 26 and a tooth 120 is in the range from about 0.05 to about 0.25, preferably in the range of about 0.12 to about 0.2 and most preferably of about 0.1 to about 0.166.

As illustrated in the drawings, in particular in FIG. 31, the length of the teeth 120 extends the full width of the track 16. This is not an absolute requirement as the teeth 120 can have a length that is less than the width of the track 16. In a specific example, the ratio between the length of a tooth 120 and the width of the track 16 is in the range from about 0.1 to about 1 (broad range), preferably in the range of about 0.5 to about 1 (intermediate range) and most preferably of about 0.75 to about 1 (narrow range).

Since the teeth 120 are relatively small in terms of height, the idler wheels 32a do not need to be provided with complementary recesses to accommodate the teeth 120. Accordingly, the circumferential surfaces of the idler wheels 32a that engage the teeth 120 can be smooth surfaced. Alternatively, those surfaces can be made with complementary recesses as in the case of the sprocket 30a.

In a specific and non-limiting example of implementation, the ratio between the diameter of an idler wheel 32a and the height of the teeth 120 is in the range from about 0.018 to about 0.01, preferably in the range of about 0.0166 to about 0.0133 and most preferably of about 0.0153 to about 0.0143.

A ratio between the diameter of the idler wheel 32a and the pitch of the teeth 120 is in the range from about 0.045 to about 0.025, preferably in the range of about 0.0415 to about 0.033 and most preferably of about 0.0383 to about 0.03575.

As shown in FIG. 32, the mid-rollers 24 are shorter than the full width of the track 16 and engage only a portion of the inner surface 16a of the track 16. The width of the mid-rollers 24 is such that they abut the drive lugs 26 which constitute an alignment mechanism to keep the track 16 along the correct path of travel over the ground engaging run 18. Alternatively, the mid-rollers 24 can be made to extend the full length of the track 16; however they would require a central clearance to accommodate the drive lugs 26. Yet another possibility is to provide an additional mid-roller set 24a, that is internal and that also engages the drive lugs 26 on their sides such as to more positively maintain the alignment of the track 16.

The mid-rollers 24, 24a can be smooth surfaced or can be provided with recesses matching the teeth 120.

In a specific and non-limiting example of implementation, the ratio between the diameter of a mid-roller 24 and the height of the teeth 120 is in the range from about 0.0308 to about 0.02, preferably in the range of about 0.029 to about 0.0234 and most preferably of about 0.029 to about 0.025.

A ratio between the diameter of the mid-roller 24 and the pitch of the teeth 120 is in the range from about 0.077 to about 0.05, preferably in the range of about 0.0725 to about 0.0585 and most preferably of about 0.0725 to about 0.0625.

In a possible variant, the undercarriage can be modified to use only the teeth 120 for driving the track 16. In other words, the drive lugs 26 and the corresponding sockets 28 on the sprocket 30a would be omitted.

In another possible variant, the pattern of the teeth 120 can be changed and does not always need to be such that the teeth 120 extend perpendicular to the longitudinal axis of the track 16. For example:

The teeth 120 can angled, as shown in FIG. 33. In this fashion the teeth 120 would engage the corresponding teeth on the sprocket 30a gradually causing them to run more smoothly.

The teeth 120 can be arranged in chevrons, as shown in FIG. 34 which has the advantage of cancelling any lateral thrust that angular teeth 120 would create on the track 16.

In any of the aforementioned alternative teeth patterns, corresponding patterns would also be required on the sprocket 30a, and possibly also on the idler wheels 32a.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A sprocket for a tracked vehicle, the sprocket having a plurality of sockets for engaging drive lugs on an inner surface of a track driven by the sprocket, the sprocket also including a support surface for engaging the inner surface of the track in rolling contact with the inner surface of the track, the sprocket comprising a sensor configured to sense a load between the sprocket and the track.

2. A drive wheel for a tracked undercarriage of a vehicle, the tracked undercarriage comprising a track for engaging the ground, the drive wheel comprising:
- a track-engaging portion for driving the track; and
- a sensor configured to sense a load between the drive wheel and the track.

3. The drive wheel of claim 2, wherein the sensor is a pressure sensor and the load between the drive wheel and the track is pressure between the drive wheel and the track.

4. The drive wheel of claim 2, wherein the sensor is configured to cause issuance of a signal processable by a processing apparatus to perform an action related to controlling the vehicle.

5. The drive wheel of claim 4, wherein the sensor comprises a wireless transmitter configured to wirelessly transmit the signal.

6. The drive wheel of claim 4, wherein the action related to controlling the vehicle is an action controlling the vehicle.

7. The drive wheel of claim 6, wherein the action controlling the vehicle is an action controlling the tracked undercarriage.

8. The drive wheel of claim 7, wherein the action controlling the tracked undercarriage is an action controlling the drive wheel.

9. The drive wheel of claim 8, wherein: the track comprises a ground-engaging outer surface for engaging the ground, an inner surface opposite to the ground-engaging outer surface, and a plurality of drive lugs projecting from the inner surface to engage the drive wheel; the track-engaging portion of the drive wheel comprises a plurality of drive members spaced apart in a circumferential direction of the drive wheel to engage the drive lugs of the track, and a friction drive surface extending along the circumferential direction of the drive wheel; and the action controlling the drive wheel is an action causing engagement of the friction drive surface of the drive wheel with the inner surface of the track.

10. The drive wheel of claim 6, wherein the load between the drive wheel and the track is indicative of loading on the track and the action controlling the vehicle is based on the loading on the track.

11. The drive wheel of claim 2, wherein: the track comprises a ground-engaging outer surface for engaging the ground, an inner surface opposite to the ground-engaging outer surface, and a plurality of drive lugs projecting from the inner surface to engage the drive wheel; and the load between the drive wheel and the track is a load between the drive wheel and at least one of the drive lugs.

12. The drive wheel of claim 2, wherein: the track comprises a ground-engaging outer surface for engaging the ground, an inner surface opposite to the ground-engaging outer surface, and a plurality of drive lugs projecting from the inner surface to engage the drive wheel; the track-engaging portion of the drive wheel comprises a plurality of drive members spaced apart in a circumferential direction of the drive wheel to engage the drive lugs of the track; and the sensor is disposed in a given one of the drive members.

13. The drive wheel of claim 2, wherein the sensor is a first sensor and the drive wheel comprises a second sensor configured to sense the load between the drive wheel and the track.

14. A tracked undercarriage comprising the drive wheel of claim 2.

15. A vehicle comprising the drive wheel of claim 2.

16. A drive wheel for a tracked undercarriage of a vehicle, the tracked undercarriage comprising a track for engaging the ground, the drive wheel comprising:
- a track-engaging portion for driving the track; and
- a sensor configured to sense a load between the drive wheel and the track and to cause issuance of a signal processable by a processing apparatus to perform an action controlling the vehicle based on the load between the drive wheel and the track.

17. The drive wheel of claim 16, wherein the sensor is a pressure sensor and the load between the drive wheel and the track is pressure between the drive wheel and the track.

18. The drive wheel of claim 16, wherein the sensor comprises a wireless transmitter configured to wirelessly transmit the signal.

19. The drive wheel of claim 16, wherein the action controlling the vehicle is an action controlling the tracked undercarriage.

20. The drive wheel of claim 19, wherein the action controlling the tracked undercarriage is an action controlling the drive wheel.

21. The drive wheel of claim 20, wherein: the track comprises a ground-engaging outer surface for engaging the ground, an inner surface opposite to the ground-engaging outer surface, and a plurality of drive lugs projecting from the inner surface to engage the drive wheel; the track-engaging portion of the drive wheel comprises a plurality of drive members spaced apart in a circumferential direction of the drive wheel to engage the drive lugs of the track, and a friction drive surface extending along the circumferential direction of the drive wheel; and the action controlling the drive wheel is an action causing engagement of the friction drive surface of the drive wheel with the inner surface of the track.

22. The drive wheel of claim 16, wherein the load between the drive wheel and the track is indicative of loading on the track and the action controlling the vehicle is based on the loading on the track.

23. The drive wheel of claim 16, wherein: the track comprises a ground-engaging outer surface for engaging the ground, an inner surface opposite to the ground-engaging outer surface, and a plurality of drive lugs projecting from the inner surface to engage the drive wheel; and the load between the drive wheel and the track is a load between the drive wheel and at least one of the drive lugs.

24. The drive wheel of claim 16, wherein: the track comprises a ground-engaging outer surface for engaging the ground, an inner surface opposite to the ground-engaging outer surface, and a plurality of drive lugs projecting from the inner surface to engaging the drive wheel; the track-engaging portion of the drive wheel comprises a plurality of drive members spaced apart in a circumferential direction of the drive wheel to engage the drive lugs of the track; and the sensor is disposed in a given one of the drive members.

25. The drive wheel of claim 16, wherein the sensor is a first sensor and the drive wheel comprises a second sensor configured to sense the load between the drive wheel and the track.

26. A tracked undercarriage comprising the drive wheel of claim 16.

27. A vehicle comprising the drive wheel of claim 16.

* * * * *